US012686337B2

(12) United States Patent
Du et al.

(10) Patent No.: US 12,686,337 B2
(45) Date of Patent: *Jul. 21, 2026

(54) VEHICLE AND VEHICLE STEP APPARATUS WITH MULTIPLE DRIVE MOTORS

(71) Applicant: T-MAX (HANGZHOU) TECHNOLOGY CO., LTD., Hangzhou (CN)

(72) Inventors: Xinfa Du, Hangzhou (CN); Qi Zhang, Hangzhou (CN); Yiming Wang, Hangzhou (CN)

(73) Assignee: T-MAX (HANGZHOU) TECHNOLOGY, CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/883,975

(22) Filed: Sep. 12, 2024

(65) Prior Publication Data

US 2025/0001943 A1     Jan. 2, 2025

Related U.S. Application Data

(63) Continuation of application No. 17/555,325, filed on Dec. 17, 2021, now Pat. No. 12,115,940, which is a
(Continued)

(30) Foreign Application Priority Data

| Aug. 4, 2015 | (CN) | ......................... 201510468824.6 |
| Aug. 4, 2015 | (CN) | ......................... 201510469324.4 |

(Continued)

(51) Int. Cl.
*B60R 3/00* (2006.01)
*B60R 3/02* (2006.01)
(Continued)

(52) U.S. Cl.
CPC ................ *B60R 3/02* (2013.01); *B60R 3/002* (2013.01); *F16H 1/16* (2013.01); *F16H 1/46* (2013.01);
(Continued)

(58) Field of Classification Search
CPC .. B60R 3/02; B60R 3/00; B60R 3/002; E06C 5/18; E06C 5/22; F16H 1/16; F16H 37/041; F16H 1/46; F16H 2701/02
See application file for complete search history.

(56) References Cited

U.S. PATENT DOCUMENTS

| 7,591 A | 8/1850 | Burdett |
| 634,385 A | 10/1899 | Wolfe et al. |

(Continued)

FOREIGN PATENT DOCUMENTS

| CA | 1021826 | 11/1977 |
| CA | 2082177 | 5/1994 |

(Continued)

OTHER PUBLICATIONS

International Search Report and Written Opinion of the International Searching Authority for PCT International Application No. PCT/CN2015/097930 mailed May 10, 2016.
(Continued)

*Primary Examiner* — Minnah L Seoh
(74) *Attorney, Agent, or Firm* — Perkins Coie LLP

(57) ABSTRACT

A method is described for operating a motorized vehicle step that comprises driving, by a first motor assembly, a first step bracket to move a step, coupled to the first step bracket, between a first extended position and a first retracted position; driving, by a second motor assembly, a second step bracket to move a step, coupled to the second step bracket, between a second extended position and a second retracted position, wherein the second extended position is aligned
(Continued)

with the first extended position, and wherein the second retracted position is aligned with the first retracted position; and retaining, by the first motor assembly and the second motor assembly, the first step bracket and the second step bracket in the first retracted position and the second retracted position, respectively, by a reverse self-locking effect of the first motor assembly and the second motor assembly, respectively.

18 Claims, 13 Drawing Sheets

Related U.S. Application Data continuation of application No. 15/931,474, filed on May 13, 2020, now Pat. No. 11,208,043, which is a continuation of application No. 16/826,094, filed on Mar. 20, 2020, now Pat. No. 11,021,108, which is a continuation of application No. 16/655,149, filed on Oct. 16, 2019, now Pat. No. 10,618,472, which is a continuation-in-part of application No. 15/200,940, filed on Jul. 1, 2016, now Pat. No. 10,479,278.

(30)     Foreign Application Priority Data

| Aug. 4, 2015 | (CN) | .......................... | 201520576675.0 |
| Aug. 4, 2015 | (CN) | .......................... | 201520580148.7 |
| Oct. 30, 2015 | (CN) | .......................... | 201510731518.7 |
| Oct. 30, 2015 | (CN) | .......................... | 201520860004.7 |

(51) Int. Cl.
|  |  |
|---|---|
| *F16H 1/16* | (2006.01) |
| *F16H 1/46* | (2006.01) |
| *F16H 37/04* | (2006.01) |

(52) U.S. Cl.
CPC ....... *F16H 37/041* (2013.01); *F16H 2702/02* (2013.01)

(56)          References Cited

U.S. PATENT DOCUMENTS

| 724,155 | A | 3/1903 | Besse |
|---|---|---|---|
| 752,031 | A | 2/1904 | Chadwick |
| 817,224 | A | 4/1906 | Clifford |
| 955,658 | A | 4/1910 | Mitchell et al. |
| 1,063,643 | A | 6/1913 | Blake et al. |
| 1,169,140 | A | 1/1916 | Fassett et al. |
| 1,176,538 | A | 3/1916 | Warner |
| 1,182,169 | A | 5/1916 | Hansen |
| 1,222,127 | A | 4/1917 | Perri |
| 1,239,892 | A | 9/1917 | Dunderdale |
| 1,242,828 | A | 10/1917 | Lyle |
| 1,250,604 | A | 12/1917 | Lorenc |
| 1,268,335 | A | 6/1918 | Fairchild |
| 1,364,697 | A | 1/1921 | Branch |
| 1,437,648 | A | 12/1922 | Gore |
| 1,449,031 | A | 3/1923 | Blake |
| 1,471,972 | A | 10/1923 | Miller |
| 1,509,235 | A | 9/1924 | Giuliani |
| 1,621,479 | A | 3/1927 | Cleveland et al. |
| 1,755,942 | A | 4/1930 | Woolson |
| 1,800,162 | A | 4/1931 | Stroud |
| 2,029,745 | A | 2/1936 | Stiner |
| 2,041,640 | A | 5/1936 | Goss |
| 2,118,557 | A | 5/1938 | Hamilton |
| 2,122,040 | A | 6/1938 | Machovec |
| 2,125,085 | A | 7/1938 | Pool |
| 2,197,266 | A | 4/1940 | Fredell |
| 2,209,576 | A | 7/1940 | McDonald |
| 2,246,986 | A | 6/1941 | Pellegrini |

| 2,436,961 | A | 3/1948 | Gabriel |
|---|---|---|---|
| 2,487,921 | A | 11/1949 | Culver |
| 2,492,068 | A | 12/1949 | Schofield et al. |
| 2,566,401 | A | 9/1951 | Bustin |
| 2,575,615 | A | 11/1951 | Crump |
| 2,583,894 | A | 1/1952 | Shuck |
| 2,645,504 | A | 7/1953 | Branstrator et al. |
| 2,669,613 | A | 2/1954 | Despard |
| 2,678,832 | A | 5/1954 | Wright |
| 2,682,671 | A | 7/1954 | Faure |
| 2,764,422 | A | 9/1956 | McDonald |
| 2,774,494 | A | 12/1956 | Malmström |
| 2,825,582 | A | 3/1958 | McDonald |
| 2,921,643 | A | 1/1960 | Vanderveld |
| 2,925,876 | A | 2/1960 | Wagner |
| 2,998,265 | A | 8/1961 | Kozicki |
| 3,008,533 | A | 11/1961 | Haberle |
| 3,012,633 | A | 12/1961 | Magee |
| 3,039,562 | A | 6/1962 | Wagner |
| 3,095,216 | A | 6/1963 | Browne et al. |
| 3,164,394 | A | 1/1965 | Husko |
| 3,172,499 | A | 3/1965 | Stairs |
| 3,266,594 | A | 8/1966 | Antosh et al. |
| 3,329,443 | A | 7/1967 | Lowder et al. |
| 3,392,990 | A | 7/1968 | Wolf |
| 3,488,066 | A | 1/1970 | Hansen |
| 3,494,634 | A | 2/1970 | De Paula |
| 3,515,406 | A | 6/1970 | Endsley |
| 3,517,942 | A | 6/1970 | Cuffe et al. |
| 3,522,396 | A | 7/1970 | Norden |
| 3,528,574 | A | 9/1970 | Denner et al. |
| 3,572,754 | A | 3/1971 | Fowler |
| 3,608,957 | A | 9/1971 | Maneck |
| 3,650,423 | A | 3/1972 | O'Brien |
| 3,671,058 | A | 6/1972 | Kent |
| 3,745,595 | A | 7/1973 | Nagy |
| 3,756,622 | A | 9/1973 | Pyle et al. |
| 3,762,742 | A | 10/1973 | Bucklen |
| 3,784,227 | A | 1/1974 | Rogge |
| 3,799,288 | A | 3/1974 | Manuel |
| 3,807,757 | A | 4/1974 | Carpenter et al. |
| 3,833,240 | A | 9/1974 | Weiler |
| 3,853,369 | A | 12/1974 | Holden |
| 3,863,890 | A | 2/1975 | Ruffing |
| 3,865,399 | A | 2/1975 | Way |
| 3,869,022 | A | 3/1975 | Wallk |
| 3,869,169 | A | 3/1975 | Johnson et al. |
| 3,887,217 | A | 6/1975 | Thomas |
| 3,889,997 | A | 6/1975 | Schoneck |
| 3,891,261 | A | 6/1975 | Finneman |
| 3,913,497 | A | 10/1975 | Maroshick |
| 3,915,475 | A | 10/1975 | Casella et al. |
| 3,957,284 | A | 5/1976 | Wright |
| 3,961,809 | A | 6/1976 | Clugston |
| 3,980,319 | A | 9/1976 | Kirkpatrick |
| 3,981,515 | A | 9/1976 | Rosborough |
| 3,986,724 | A | 10/1976 | Rivinius |
| 3,997,211 | A | 12/1976 | Graves |
| 4,020,920 | A | 5/1977 | Abbott |
| 4,053,172 | A | 10/1977 | McClure |
| 4,058,228 | A | 11/1977 | Hall |
| 4,068,542 | A | 1/1978 | Brand et al. |
| 4,073,502 | A | 2/1978 | Frank et al. |
| 4,089,538 | A | 5/1978 | Eastridge |
| 4,098,346 | A | 7/1978 | Stanfill |
| 4,106,790 | A | 8/1978 | Weiler |
| 4,110,673 | A | 8/1978 | Nagy et al. |
| 4,116,457 | A | 9/1978 | Nerem et al. |
| 4,124,099 | A | 11/1978 | Dudynskyj |
| 4,145,066 | A | 3/1979 | Shearin |
| 4,164,292 | A | 8/1979 | Karkau |
| 4,168,764 | A | 9/1979 | Walters |
| 4,174,021 | A | 11/1979 | Barlock |
| 4,180,143 | A | 12/1979 | Clugston |
| 4,185,849 | A | 1/1980 | Jaeger |
| 4,188,889 | A | 2/1980 | Favrel |
| 4,194,754 | A | 3/1980 | Hightower |
| 4,205,862 | A | 6/1980 | Tarvin |
| 4,219,104 | A | 8/1980 | MacLeod |

(56)  References Cited

U.S. PATENT DOCUMENTS

| | | |
|---|---|---|
| 4,231,583 A | 11/1980 | Learn |
| 4,275,664 A | 6/1981 | Reddy |
| 4,325,668 A | 4/1982 | Julian et al. |
| 4,369,984 A | 1/1983 | Hagen |
| 4,424,751 A | 1/1984 | Blochlinger |
| 4,440,364 A | 4/1984 | Cone et al. |
| 4,462,486 A | 7/1984 | Dignan |
| 4,536,004 A | 8/1985 | Brynielsson et al. |
| 4,542,805 A | 9/1985 | Hamlin et al. |
| 4,570,962 A | 2/1986 | Chavira |
| 4,623,160 A | 11/1986 | Trudell |
| D287,001 S | 12/1986 | Jarvie et al. |
| 4,676,013 A | 6/1987 | Endo |
| 4,679,810 A | 7/1987 | Kimball |
| 4,696,349 A | 9/1987 | Harwood et al. |
| D292,904 S | 11/1987 | Bielby |
| 4,708,355 A | 11/1987 | Tiede |
| 4,711,613 A | 12/1987 | Fretwell |
| 4,720,116 A | 1/1988 | Williams et al. |
| 4,733,752 A | 3/1988 | Sklar |
| 4,757,876 A | 7/1988 | Peacock |
| 4,846,487 A | 7/1989 | Criley |
| 4,858,888 A | 8/1989 | Cruz et al. |
| 4,909,700 A | 3/1990 | Fontecchio et al. |
| 4,911,264 A | 3/1990 | McCafferty |
| 4,926,965 A | 5/1990 | Fox |
| 4,930,973 A | 6/1990 | Robinson |
| 4,958,979 A | 9/1990 | Svensson |
| 4,982,974 A | 1/1991 | Guidry |
| 4,991,890 A | 2/1991 | Paulson |
| D316,394 S | 4/1991 | Carr |
| 5,005,667 A | 4/1991 | Anderson |
| 5,005,850 A | 4/1991 | Baughman |
| 5,007,654 A | 4/1991 | Sauber |
| 5,028,063 A | 7/1991 | Andrews |
| 5,039,119 A | 8/1991 | Baughman |
| 5,085,450 A | 2/1992 | DeHart, Sr. |
| 5,137,294 A | 8/1992 | Martin |
| 5,154,125 A | 10/1992 | Renner et al. |
| 5,195,609 A | 3/1993 | Ham et al. |
| 5,199,731 A | 4/1993 | Martin |
| 5,228,707 A | 7/1993 | Yoder |
| 5,228,761 A | 7/1993 | Huebschen et al. |
| 5,238,300 A | 8/1993 | Slivon et al. |
| 5,253,973 A | 10/1993 | Fretwell |
| D340,905 S | 11/1993 | Orth et al. |
| 5,257,767 A | 11/1993 | McConnell |
| 5,257,847 A | 11/1993 | Yonehara |
| 5,261,779 A | 11/1993 | Goodrich |
| 5,280,934 A | 1/1994 | Monte |
| 5,284,349 A | 2/1994 | Bruns et al. |
| 5,286,049 A | 2/1994 | Khan |
| 5,342,073 A | 8/1994 | Poole |
| 5,358,268 A | 10/1994 | Hawkins |
| 5,375,864 A | 12/1994 | McDaniel |
| 5,423,463 A | 6/1995 | Weeks |
| 5,425,615 A | 6/1995 | Hall et al. |
| 5,439,342 A | 8/1995 | Hall et al. |
| 5,462,302 A | 10/1995 | Leitner |
| 5,478,124 A | 12/1995 | Warrington |
| 5,498,012 A | 3/1996 | McDaniel et al. |
| 5,501,475 A | 3/1996 | Bundy |
| 5,505,476 A | 4/1996 | Maccabee |
| 5,513,866 A | 5/1996 | Sisson |
| 5,538,100 A | 7/1996 | Hedley |
| 5,538,265 A | 7/1996 | Chen et al. |
| 5,538,269 A | 7/1996 | McDaniel et al. |
| 5,547,040 A | 8/1996 | Hanser et al. |
| 5,549,312 A | 8/1996 | Garvert |
| 5,584,493 A | 12/1996 | Demski et al. |
| 5,601,300 A | 2/1997 | Fink et al. |
| 5,624,127 A | 4/1997 | Arreola et al. |
| 5,697,623 A | 12/1997 | Bermes et al. |
| 5,697,626 A | 12/1997 | McDaniel |
| 5,727,840 A | 3/1998 | Ochiai et al. |
| 5,779,208 A | 7/1998 | McGraw |
| 5,842,709 A | 12/1998 | Maccabee |
| 5,876,051 A | 3/1999 | Sage |
| 5,897,125 A | 4/1999 | Bundy |
| 5,937,468 A | 8/1999 | Wiedeck et al. |
| 5,941,342 A | 8/1999 | Lee |
| 5,957,237 A | 9/1999 | Tigner |
| 5,980,449 A | 11/1999 | Benson et al. |
| 5,988,970 A | 11/1999 | Holtom |
| 6,012,545 A | 1/2000 | Faleide |
| 6,027,090 A | 2/2000 | Liu |
| 6,042,052 A | 3/2000 | Smith et al. |
| 6,055,780 A | 5/2000 | Yamazaki |
| 6,065,924 A | 5/2000 | Budd |
| 6,082,693 A | 7/2000 | Benson et al. |
| 6,082,751 A | 7/2000 | Hanes et al. |
| 6,112,152 A | 8/2000 | Tuttle |
| 6,135,472 A | 10/2000 | Wilson et al. |
| 6,149,172 A | 11/2000 | Pascoe et al. |
| 6,158,756 A | 12/2000 | Hansen |
| 6,168,176 B1 | 1/2001 | Mueller |
| 6,170,842 B1 | 1/2001 | Mueller |
| 6,179,312 B1 | 1/2001 | Paschke et al. |
| 6,179,546 B1 | 1/2001 | Citrowske |
| 6,203,040 B1 | 3/2001 | Hutchins |
| 6,213,486 B1 | 4/2001 | Kunz et al. |
| 6,224,317 B1 | 5/2001 | Kann |
| 6,264,222 B1 | 7/2001 | Johnston et al. |
| 6,270,099 B1 | 8/2001 | Farkash |
| 6,325,397 B1 | 12/2001 | Pascoe |
| 6,352,295 B1 | 3/2002 | Leitner |
| 6,357,992 B1 | 3/2002 | Ringdahl et al. |
| 6,375,207 B1 | 4/2002 | Dean et al. |
| 6,412,799 B1 | 7/2002 | Schrempf |
| 6,422,342 B1 | 7/2002 | Armstrong et al. |
| 6,425,572 B1 | 7/2002 | Lehr |
| 6,430,164 B1 | 8/2002 | Jones et al. |
| 6,435,534 B1 | 8/2002 | Stone |
| 6,439,342 B1 | 8/2002 | Boykin |
| 6,460,915 B1 | 10/2002 | Bedi et al. |
| 6,471,002 B1 | 10/2002 | Weinermen |
| 6,511,086 B2 | 1/2003 | Schlicht |
| 6,511,402 B2 | 1/2003 | Shu |
| 6,513,821 B1 | 2/2003 | Heil |
| 6,533,303 B1 | 3/2003 | Watson |
| 6,536,790 B1 | 3/2003 | Ojanen |
| 6,588,783 B2 | 7/2003 | Fichter |
| 6,612,596 B2 | 9/2003 | Jeon et al. |
| 6,641,158 B2 | 11/2003 | Leitner |
| 6,659,484 B2 | 12/2003 | Knodle et al. |
| 6,663,125 B1 | 12/2003 | Cheng |
| 6,746,033 B1 | 6/2004 | McDaniel |
| 6,769,704 B2 | 8/2004 | Cipolla |
| 6,810,995 B2 | 11/2004 | Warford |
| 6,812,466 B2 | 11/2004 | O'Connor et al. |
| 6,830,257 B2 | 12/2004 | Leitner |
| 6,834,875 B2 * | 12/2004 | Leitner ................ B60R 3/002 |
| | | 280/727 |
| 6,840,526 B2 | 1/2005 | Anderson et al. |
| 6,874,801 B2 | 4/2005 | Fichter |
| 6,880,843 B1 | 4/2005 | Greer, Jr. |
| 6,912,912 B2 | 7/2005 | Reichinger et al. |
| 6,918,624 B2 | 7/2005 | Miller et al. |
| 6,926,295 B2 | 8/2005 | Berkebile et al. |
| 6,938,909 B2 | 9/2005 | Leitner |
| 6,942,233 B2 | 9/2005 | Leitner et al. |
| 6,942,272 B2 | 9/2005 | Livingston |
| 6,948,903 B2 | 9/2005 | Ablabutyan et al. |
| 6,951,357 B2 | 10/2005 | Armstrong et al. |
| 6,955,370 B2 | 10/2005 | Fabiano et al. |
| 6,959,937 B2 | 11/2005 | Schneider et al. |
| 6,966,597 B2 | 11/2005 | Tegtmeier |
| 6,971,652 B2 | 12/2005 | Bobbert et al. |
| 6,997,469 B2 | 2/2006 | Lanoue et al. |
| 7,000,932 B2 | 2/2006 | Heil et al. |
| 7,007,961 B2 | 3/2006 | Leitner |
| 7,017,927 B2 | 3/2006 | Henderson et al. |
| 7,055,839 B2 | 6/2006 | Leitner |
| 7,090,276 B1 | 8/2006 | Bruford et al. |

(56)  References Cited

U.S. PATENT DOCUMENTS

| | | | |
|---|---|---|---|
| 7,111,859 B2 | 9/2006 | Kim et al. | |
| 7,118,120 B2 | 10/2006 | Lee et al. | |
| 7,163,221 B2 | 1/2007 | Leitner | |
| 7,258,386 B2 | 8/2007 | Leitner | |
| 7,287,771 B2 * | 10/2007 | Lee | B60R 3/002 |
| | | | 280/166 |
| 7,360,779 B2 | 4/2008 | Crandall | |
| 7,367,574 B2 | 5/2008 | Leitner | |
| 7,380,807 B2 | 6/2008 | Leitner | |
| 7,398,985 B2 * | 7/2008 | Leitner | B60R 3/02 |
| | | | 280/166 |
| 7,413,204 B2 | 8/2008 | Leitner | |
| 7,416,202 B2 | 8/2008 | Fichter | |
| 7,487,986 B2 | 2/2009 | Leither et al. | |
| 7,516,703 B2 | 4/2009 | Tazreiter | |
| 7,566,064 B2 | 7/2009 | Leitner et al. | |
| 7,584,975 B2 | 9/2009 | Leitner | |
| 7,594,672 B2 | 9/2009 | Piotrowski | |
| 7,621,546 B2 | 11/2009 | Ross et al. | |
| 7,637,519 B2 | 12/2009 | Leitner et al. | |
| 7,673,892 B2 | 3/2010 | Kuntze et al. | |
| 7,717,444 B2 | 5/2010 | Fichter | |
| 7,740,261 B2 | 6/2010 | Leitner et al. | |
| 7,793,596 B2 | 9/2010 | Hirtenlehner | |
| 7,823,896 B2 | 11/2010 | VanBelle | |
| 7,874,565 B2 | 1/2011 | Duncan | |
| D634,687 S | 3/2011 | Vukel | |
| 7,900,944 B2 | 3/2011 | Watson | |
| 7,909,344 B1 | 3/2011 | Bundy | |
| 7,934,737 B2 | 5/2011 | Okada | |
| 7,976,042 B2 | 7/2011 | Watson et al. | |
| 8,038,164 B2 | 10/2011 | Stahl et al. | |
| 8,042,821 B2 * | 10/2011 | Yang | B60R 3/02 |
| | | | 280/166 |
| D649,100 S | 11/2011 | Cheng | |
| 8,052,162 B2 | 11/2011 | Yang et al. | |
| 8,056,913 B2 | 11/2011 | Kuntze et al. | |
| 8,070,173 B2 | 12/2011 | Watson | |
| 8,136,826 B2 | 3/2012 | Watson | |
| 8,146,935 B1 | 4/2012 | Adams | |
| 8,157,277 B2 | 4/2012 | Leitner et al. | |
| 8,177,247 B1 | 5/2012 | Carr | |
| 8,205,901 B2 | 6/2012 | Yang et al. | |
| D665,713 S | 8/2012 | Pochurek et al. | |
| 8,262,113 B1 | 9/2012 | Chafey et al. | |
| 8,297,635 B2 | 10/2012 | Agoncillo et al. | |
| D671,874 S | 12/2012 | Kekich et al. | |
| 8,342,550 B2 | 1/2013 | Stickles et al. | |
| 8,342,551 B2 * | 1/2013 | Watson | B60R 3/02 |
| | | | 280/166 |
| 8,360,455 B2 | 1/2013 | Leitner et al. | |
| 8,408,571 B2 | 4/2013 | Leitner et al. | |
| 8,419,034 B2 | 4/2013 | Leitner et al. | |
| 8,469,380 B2 | 6/2013 | Yang et al. | |
| 8,602,431 B1 | 12/2013 | May | |
| 8,827,294 B1 | 9/2014 | Leitner et al. | |
| 8,833,782 B2 | 9/2014 | Huotari et al. | |
| 8,844,957 B2 | 9/2014 | Leitner et al. | |
| D720,674 S | 1/2015 | Stanesic et al. | |
| 8,936,266 B2 | 1/2015 | Leitner et al. | |
| 8,944,451 B2 | 2/2015 | Leitner et al. | |
| 9,156,406 B2 | 10/2015 | Stanesic et al. | |
| 9,272,667 B2 | 3/2016 | Smith | |
| 9,302,626 B2 | 4/2016 | Leitner et al. | |
| 9,346,404 B1 | 5/2016 | Bundy | |
| 9,346,405 B2 | 5/2016 | Leitner et al. | |
| 9,511,717 B2 | 12/2016 | Smith | |
| 9,522,634 B1 | 12/2016 | Smith | |
| 9,527,449 B2 | 12/2016 | Smith | |
| 9,550,458 B2 | 1/2017 | Smith et al. | |
| 9,561,751 B2 | 2/2017 | Leitner et al. | |
| 9,573,467 B2 | 2/2017 | Chen et al. | |
| 9,656,609 B2 | 5/2017 | Du et al. | |
| 9,669,766 B2 | 6/2017 | Du et al. | |
| 9,669,767 B2 | 6/2017 | Du et al. | |
| 9,688,205 B2 | 6/2017 | Du et al. | |
| 9,701,249 B2 | 7/2017 | Leitner et al. | |
| 9,764,691 B2 | 9/2017 | Stickles et al. | |
| 9,809,172 B2 | 11/2017 | Stanesic et al. | |
| 9,834,147 B2 | 12/2017 | Smith | |
| 9,902,328 B1 | 2/2018 | Mazur | |
| 9,944,231 B2 | 4/2018 | Leitner et al. | |
| 9,975,742 B1 | 5/2018 | Mason | |
| 10,010,467 B2 | 7/2018 | Sato | |
| 10,049,505 B1 | 8/2018 | Harvey | |
| 10,053,017 B2 | 8/2018 | Leitner et al. | |
| 10,065,486 B2 | 9/2018 | Smith et al. | |
| 10,077,016 B2 | 9/2018 | Smith et al. | |
| 10,081,302 B1 | 9/2018 | Frederick et al. | |
| 10,106,069 B2 | 10/2018 | Rasekhi | |
| 10,106,086 B1 | 10/2018 | Eckstein et al. | |
| 10,106,087 B2 | 10/2018 | Stojkovic et al. | |
| 10,106,088 B2 | 10/2018 | Smith | |
| 10,118,557 B2 | 11/2018 | Pribisic | |
| 10,124,735 B2 | 11/2018 | Du et al. | |
| 10,124,839 B2 | 11/2018 | Povinelli et al. | |
| 10,140,618 B2 | 11/2018 | Crawford | |
| 10,144,345 B2 | 12/2018 | Stinson et al. | |
| 10,150,419 B2 | 12/2018 | Derbis et al. | |
| 10,155,474 B2 | 12/2018 | Salter et al. | |
| 10,173,595 B1 | 1/2019 | Ulrich | |
| 10,183,623 B2 | 1/2019 | Kirshnan et al. | |
| 10,183,624 B2 | 1/2019 | Leitner et al. | |
| 10,189,517 B2 | 1/2019 | Povinelli et al. | |
| 10,195,997 B2 | 2/2019 | Smith | |
| 10,207,598 B2 | 2/2019 | Reynolds et al. | |
| 10,214,963 B2 | 2/2019 | Simula et al. | |
| 10,384,614 B1 | 8/2019 | Du et al. | |
| 10,384,661 B2 | 8/2019 | Du et al. | |
| 10,427,607 B2 | 10/2019 | Otacioglu | |
| 10,539,285 B1 | 1/2020 | Johnson | |
| 10,576,879 B1 | 3/2020 | Salter | |
| 10,604,076 B2 | 3/2020 | Lanini et al. | |
| 10,618,472 B2 | 4/2020 | Du | |
| 10,649,483 B2 | 5/2020 | Liu et al. | |
| 10,682,960 B2 | 6/2020 | Du | |
| 10,821,904 B2 | 11/2020 | Du | |
| 10,885,759 B1 | 1/2021 | Lee | |
| 11,021,108 B2 | 6/2021 | Du | |
| 11,198,394 B2 | 12/2021 | Du et al. | |
| 11,208,043 B2 | 12/2021 | Du et al. | |
| 11,208,044 B2 | 12/2021 | Smith et al. | |
| 11,292,390 B2 | 4/2022 | Du et al. | |
| 11,318,889 B2 | 5/2022 | Du et al. | |
| 11,414,017 B2 | 8/2022 | Qing et al. | |
| 2002/0109446 A1 | 8/2002 | Arnold | |
| 2002/0130531 A1 | 9/2002 | Leitner | |
| 2002/0153201 A1 | 10/2002 | Warford | |
| 2003/0011164 A1 | 1/2003 | Cipolla | |
| 2003/0038446 A1 | 2/2003 | Anderson et al. | |
| 2003/0090081 A1 | 5/2003 | Oakley | |
| 2003/0094781 A1 | 5/2003 | Jaramillo et al. | |
| 2003/0132595 A1 * | 7/2003 | Fabiano | B60R 3/002 |
| | | | 280/166 |
| 2003/0184040 A1 | 10/2003 | Leitner et al. | |
| 2003/0200700 A1 | 10/2003 | Leitner | |
| 2004/0100063 A1 | 5/2004 | Henderson et al. | |
| 2004/0108678 A1 | 6/2004 | Berkebile et al. | |
| 2004/0135339 A1 | 7/2004 | Kim | |
| 2005/0035568 A1 * | 2/2005 | Lee | B60R 3/002 |
| | | | 280/166 |
| 2005/0146157 A1 | 7/2005 | Leitner | |
| 2005/0231149 A1 | 10/2005 | Numauchi | |
| 2005/0275187 A1 | 12/2005 | Chaudoin et al. | |
| 2005/0280242 A1 | 12/2005 | Fabiano et al. | |
| 2006/0082096 A1 | 4/2006 | Sukonthapanich et al. | |
| 2006/0125204 A1 | 6/2006 | Leitner et al. | |
| 2006/0214386 A1 | 9/2006 | Watson | |
| 2006/0219484 A1 * | 10/2006 | Ogura | B60K 25/10 |
| | | | 185/39 |
| 2006/0284440 A1 | 12/2006 | Leitner | |
| 2008/0042396 A1 | 2/2008 | Watson | |
| 2008/0100023 A1 | 5/2008 | Ross | |
| 2008/0100025 A1 | 5/2008 | Leitner et al. | |

(56)      References Cited

U.S. PATENT DOCUMENTS

| | | |
|---|---|---|
| 2008/0116653 A1 | 5/2008 | Piotrowski |
| 2008/0271936 A1 | 11/2008 | Kuntze et al. |
| 2009/0250896 A1 | 10/2009 | Watson |
| 2009/0295114 A1* | 12/2009 | Yang ........................ B60R 3/02 |
| | | 280/166 |
| 2009/0295115 A1 | 12/2009 | Yang et al. |
| 2010/0044993 A1 | 2/2010 | Watson |
| 2011/0115187 A1 | 5/2011 | Leitner et al. |
| 2011/0246021 A1 | 10/2011 | Prokhorov |
| 2012/0025485 A1* | 2/2012 | Yang ........................ B60R 3/02 |
| | | 280/166 |
| 2012/0046846 A1 | 2/2012 | Dollens |
| 2013/0154230 A1 | 6/2013 | Ziaylek |
| 2015/0094898 A1 | 4/2015 | Tellis |
| 2015/0097353 A1 | 4/2015 | Rasmussen et al. |
| 2015/0137482 A1 | 5/2015 | Woolf |
| 2015/0197199 A1 | 7/2015 | Kuo |
| 2015/0321612 A1 | 11/2015 | Leitner et al. |
| 2015/0321613 A1 | 11/2015 | Leitner et al. |
| 2016/0039346 A1 | 2/2016 | Yang et al. |
| 2016/0193964 A1 | 7/2016 | Stanesic et al. |
| 2016/0280190 A1 | 9/2016 | Franz |
| 2017/0008459 A1 | 1/2017 | Leitner et al. |
| 2017/0021781 A1 | 1/2017 | Du |
| 2017/0036605 A1 | 2/2017 | Du |
| 2017/0036606 A1 | 2/2017 | Du |
| 2017/0036607 A1 | 2/2017 | Du et al. |
| 2017/0144606 A1 | 5/2017 | Smith |
| 2017/0190308 A1 | 7/2017 | Smith |
| 2017/0246993 A1 | 8/2017 | Smith |
| 2017/0267182 A1 | 9/2017 | Leitner |
| 2017/0355315 A1 | 12/2017 | Leitner |
| 2018/0095457 A1 | 4/2018 | Lee |
| 2018/0141497 A1 | 5/2018 | Smith |
| 2018/0201194 A1 | 7/2018 | Stanesic |
| 2018/0257572 A1 | 9/2018 | Du et al. |
| 2018/0281687 A1 | 10/2018 | Derbis et al. |
| 2018/0293811 A1 | 10/2018 | Liu |
| 2018/0326911 A1 | 11/2018 | Leitner |
| 2019/0009725 A1 | 1/2019 | Stojkovic et al. |
| 2019/0047477 A1 | 2/2019 | Crandall |
| 2019/0054961 A1 | 2/2019 | Ngo |
| 2019/0071021 A1 | 3/2019 | Pribisic |
| 2019/0071042 A1 | 3/2019 | Smith |
| 2019/0084482 A1 | 3/2019 | Long et al. |
| 2019/0084628 A1 | 3/2019 | Povinelli et al. |
| 2019/0294196 A1 | 9/2019 | Liu et al. |
| 2020/0023779 A1 | 1/2020 | Du et al. |
| 2020/0023780 A1 | 1/2020 | Du et al. |
| 2020/0047674 A1 | 2/2020 | Du et al. |
| 2020/0180512 A1 | 6/2020 | Godfrey |
| 2020/0262354 A1 | 8/2020 | Du et al. |
| 2020/0265658 A1 | 8/2020 | Du et al. |
| 2020/0269763 A1 | 8/2020 | Du et al. |
| 2020/0282814 A1 | 9/2020 | Alban et al. |
| 2020/0282913 A1 | 9/2020 | Qing et al. |
| 2020/0282914 A1 | 9/2020 | Du et al. |
| 2020/0290424 A1 | 9/2020 | Zhan |
| 2020/0331396 A1 | 10/2020 | Du et al. |
| 2020/0369209 A1 | 11/2020 | Pantea et al. |
| 2021/0078591 A1 | 3/2021 | Du et al. |
| 2021/0213885 A1 | 7/2021 | Du et al. |
| 2021/0221449 A1 | 7/2021 | Milani et al. |
| 2021/0347303 A1 | 11/2021 | Qing et al. |
| 2021/0347304 A1 | 11/2021 | Qing et al. |
| 2022/0097609 A1 | 3/2022 | Watson |
| 2022/0194299 A1 | 6/2022 | Du et al. |
| 2022/0219612 A1 | 7/2022 | Du et al. |
| 2022/0371517 A1 | 11/2022 | Du et al. |
| 2023/0021767 A1 | 1/2023 | Watson et al. |
| 2023/0202396 A1 | 6/2023 | Du et al. |

FOREIGN PATENT DOCUMENTS

| | | | |
|---|---|---|---|
| CA | 2218280 | A1 | 6/1999 |
| CA | 2332193 | A1 | 9/2001 |
| CA | 2370618 | A1 | 11/2007 |
| CN | 2174368 | Y | 8/1994 |
| CN | 2806241 | Y | 8/2006 |
| CN | 2815779 | Y | 9/2006 |
| CN | 1976833 | A | 6/2007 |
| CN | 101279594 | A | 10/2008 |
| CN | 201842021 | U | 5/2011 |
| CN | 102394918 | A | 3/2012 |
| CN | 202806579 | U | 3/2013 |
| CN | 103507719 | A | 1/2014 |
| CN | 203728468 | U | 2/2014 |
| CN | 104192070 | A | 12/2014 |
| CN | 204264034 | U | 4/2015 |
| CN | 204474223 | U | 7/2015 |
| CN | 204567461 | U | 8/2015 |
| CN | 204586746 | U | 8/2015 |
| CN | 105034963 | A | 11/2015 |
| CN | 105083136 | A | 11/2015 |
| CN | 105083137 | A | 11/2015 |
| CN | 105128751 | A | 12/2015 |
| CN | 105450762 | A | 3/2016 |
| CN | 106249641 | A | 12/2016 |
| CN | 106499293 | A | 3/2017 |
| CN | 107601333 | A | 1/2018 |
| CN | 108263303 | A | 7/2018 |
| CN | 207617613 | U | 7/2018 |
| CN | 108357434 | A | 8/2018 |
| CN | 108454518 | A | 8/2018 |
| CN | 207758678 | U | 8/2018 |
| CN | 108583446 | A | 9/2018 |
| CN | 108632335 | A | 10/2018 |
| CN | 108791086 | A | 11/2018 |
| CN | 108973868 | A | 12/2018 |
| CN | 208198270 | U | 12/2018 |
| CN | 208232903 | U | 12/2018 |
| CN | 109253888 | A | 1/2019 |
| CN | 208325054 | U | 1/2019 |
| CN | 208344082 | U | 1/2019 |
| CN | 208498387 | U | 2/2019 |
| CN | 110733427 | A | 1/2020 |
| CN | 110758256 | A | 2/2020 |
| CN | 210284089 | U | 4/2020 |
| CN | 211223233 | U | 8/2020 |
| CN | 111891032 | A | 11/2020 |
| CN | 213948287 | U | 8/2021 |
| CN | 214542763 | U | 10/2021 |
| CN | 214633678 | U | 11/2021 |
| CN | 215097303 | U | 12/2021 |
| CN | 215915494 | U | 3/2022 |
| CN | 216767045 | U | 6/2022 |
| CN | 216833445 | U | 6/2022 |
| CN | 116061813 | A | 5/2023 |
| CN | 219467639 | U | 8/2023 |
| DE | 1042403 | B | 10/1958 |
| DE | 1220276 | B | 6/1966 |
| DE | 2555468 | A1 | 6/1977 |
| DE | 7922488 | U1 | 7/1982 |
| DE | 3151621 | A1 | 7/1983 |
| DE | 3932142 | | 4/1990 |
| DE | 8910933 | U1 | 10/1990 |
| EP | 0066493 | | 12/1982 |
| EP | 373842 | A1 | 6/1990 |
| EP | 0418615 | A1 | 3/1991 |
| EP | 0559624 | B1 | 8/1995 |
| EP | 0901783 | A2 | 3/1999 |
| EP | 0966367 | A1 | 12/1999 |
| EP | 1116840 | A2 | 7/2001 |
| EP | 1213185 | B1 | 12/2004 |
| EP | 3002157 | | 4/2016 |
| EP | 3266670 | A1 | 1/2018 |
| EP | 3176038 | B1 | 1/2019 |
| EP | 3237254 | B1 | 2/2019 |
| FR | 1271901 | A | 9/1961 |
| FR | 1350593 | A | 1/1964 |
| FR | 2225612 | A | 8/1974 |

(56) References Cited

FOREIGN PATENT DOCUMENTS

| | | | |
|---|---|---|---|
| FR | 2651739 | A1 | 3/1991 |
| FR | 2764254 | A1 | 12/1998 |
| GB | 191315077 | | 8/1913 |
| GB | 254426 | | 7/1926 |
| GB | 340162 | A | 12/1930 |
| GB | 381672 | | 10/1932 |
| GB | 745918 | | 3/1956 |
| GB | 934387 | | 8/1963 |
| GB | 936846 | | 9/1963 |
| GB | 987846 | A | 3/1965 |
| GB | 1430813 | A | 4/1976 |
| GB | 1471256 | A | 4/1977 |
| GB | 2045699 | A | 11/1980 |
| GB | 2055705 | A | 3/1981 |
| GB | 2129378 | | 5/1984 |
| GB | 2201511 | A | 9/1988 |
| GB | 2288014 | A | 10/1995 |
| IN | 201741011829 | | 10/2018 |
| JP | S63255144 | A | 10/1988 |
| JP | H04138944 | A | 5/1992 |
| JP | H04339040 | A | 11/1992 |
| JP | H04342629 | A | 11/1992 |
| JP | H05310061 | A | 11/1993 |
| JP | H05310081 | A | 11/1993 |
| JP | H08132967 | A | 5/1996 |
| JP | H10287182 | A | 10/1998 |
| JP | 2008105567 | A | 5/2008 |
| JP | 2018-177089 | A | 11/2018 |
| JP | 2019-001222 | A | 1/2019 |
| KR | 19980010764 | U | 5/1998 |
| KR | 2000-0003099 | U | 2/2000 |
| KR | 101719102 | B1 | 3/2017 |
| MX | 2017001699 | A | 8/2018 |
| MX | 2017001700 | A | 8/2018 |
| MX | 2017006328 | A | 8/2018 |
| MX | 2017008032 | A | 9/2018 |
| MX | 2017010183 | A | 9/2018 |
| SU | 403594 | | 11/1973 |
| SU | 783097 | A1 | 11/1980 |
| WO | 1988/05759 | A1 | 8/1988 |
| WO | 1995/00359 | A1 | 1/1995 |
| WO | 1997/027139 | A1 | 7/1997 |
| WO | 1998/43856 | A2 | 10/1998 |
| WO | 2000/047449 | A1 | 8/2000 |
| WO | 2001/000441 | A1 | 1/2001 |
| WO | 2003/039910 | A1 | 5/2003 |
| WO | 2003/039920 | A1 | 5/2003 |
| WO | 2003/066380 | A1 | 8/2003 |
| WO | 2003/069294 | A1 | 8/2003 |
| WO | 2006/050297 | A2 | 5/2006 |
| WO | 2009/103163 | A1 | 8/2009 |
| WO | 2017/176226 | A1 | 10/2017 |
| WO | 2018/148643 | A1 | 8/2018 |
| WO | 2018/197393 | A1 | 11/2018 |
| WO | 2019/009131 | A1 | 1/2019 |
| WO | 2019/034493 | A1 | 2/2019 |

OTHER PUBLICATIONS

U.S. Office Action mailed Nov. 18, 2019 for U.S. Appl. No. 16/510,775, filed Jul. 12, 2019. (9 pages).

U.S. Office Action mailed Dec. 20, 2019 for U.S. Appl. No. 16/655,149, filed Oct. 16, 2019. (11 pages).

International Search Report and Written Opinion of the International Searching Authority for PCT International Application No. PCT/CN2019/075535 mailed Nov. 11, 2019. (English translation, p. 1-21).

International Search Report and Written Opinion of the International Searching Authority for Application No. PCT/CN2019/077842 mailed Oct. 12, 2019, 13 pages with English translation.

International Search Report and Written Opinion of the International Searching Authority for PCT International Application No. PCT/CN2019/082919 mailed Oct. 11, 2019, 20 pages with English translation.

U.S. Office Non-Final Action Mailed Jun. 9, 2020 for U.S. Appl. No. 15/931,474, filed May 13, 2020 (12 pages).

U.S. Notice of Allowance for U.S. Appl. No. 16/510,775 Mailed Feb. 3, 2020.

U.S. Notice of Allowance for U.S. Appl. No. 16/655,149 Mailed Feb. 20, 2020.

U.S. Notice of Allowance for U.S. Appl. No. 16/826,083 mailed Oct. 9, 2020.

Australian Application No. 2019250149 Office Action Mailed Oct. 6, 2020, 5 pages.

Final Office Action Mailed Oct. 27, 2020 for U.S. Appl. No. 15/931,474, filed Oct. 27, 2020 (13 pages).

No Author. Installation Guide, Part 78139. Apr. 5, 2017, pp. 1-15.

No Author. Installation Guide, Part 78151. Sep. 15, 2017, pp. 1-9.

No Author. Installation Guide, Part 78154. Jan. 3, 2019, pp. 1-11.

No Author. Installation Guide, Part 78234. Jun. 27, 2017, pp. 1-10.

No Author. Installation Guide, Part 78235. Jan. 2, 2019, pp. 1-10.

No Author. Installation Guide, Part 78239. Aug. 1, 2019, pp. 1-15.

No Author. Installation Guide, Part 78240. Mar. 3, 2020, pp. 1-11.

No Author. Installation Guide, Part 78254. Jan. 13, 2020, pp. 1-14.

Final Office Action Mailed Feb. 16, 2021 for U.S. Appl. No. 16/826,094, filed Mar. 20, 2020 (15 pages).

Non-Final Office Action Mailed Jun. 10, 2021 for U.S. Appl. No. 16/517,527, filed Jul. 19, 2019 (6 pages).

Chinese Patent Office, First Office Action for Chinese Application No. 201910125764.6, mailed on May 6, 2021, 13 pages with English translation.

U.S. Appl. No. 16/810,637 Office Action Mailed Oct. 14, 2021, pp. 1-9.

U.S. Appl. No. 16/517,527 Notice of Allowance Mailed Sep. 17, 2021, pp. 1-7.

U.S. Appl. No. 15/931,474, Notice of Allowance Mailed Nov. 17, 2021, pp. 1-5.

U.S. Appl. No. 17/218,054, Non-Final Office Action Mailed Dec. 9, 2021, 9 pages.

U.S. Appl. No. 17/218,054, Notice of Allowance Mailed Mar. 23, 2022, pp. 1-5.

Non-Final Office Action Mailed Apr. 29, 2022 for U.S. Appl. No. 16/854,876, filed Apr. 21, 2020 (10 pages).

U.S. Notice of Allowance for U.S. Appl. No. 16/854,876 mailed Aug. 1, 2022.

Non-Final Office Action Mailed Jun. 16, 2022 for U.S. Appl. No. 16/913,703, filed Jun. 26, 2020 (20 pages).

U.S. Notice of Allowance for U.S. Appl. No. 17/317,426 mailed Oct. 12, 2022.

U.S. Notice of Allowance for U.S. Appl. No. 16/826,083 mailed Dec. 30, 2020.

U.S. Notice of Allowance for U.S. Appl. No. 16/826,083 mailed Jan. 21, 2022.

Non-Final Office Action Mailed Nov. 26, 2018 for U.S. Appl. No. 15/200,940 (8 pages).

Final Office Action Mailed May 3, 2019 for U.S. Appl. No. 15/200,940, filed Jul. 1, 2016 (11 pages).

U.S. Notice of Allowance for U.S. Appl. No. 15/200,940 mailed Jul. 19, 2019.

Non-Final Office Action Mailed Apr. 13, 2022 for U.S. Appl. No. 16/682,960, filed Nov. 13, 2019 (41 pages).

Non-Final Office Action Mailed Apr. 23, 2021 for U.S. Appl. No. 15/931,474, filed May 13, 2020 (11 pages).

Final Office Action Mailed Sep. 3, 2021 for U.S. Appl. No. 15/931,474, filed May 13, 2020 (5 pages).

U.S. Notice of Allowance for U.S. Appl. No. 16/810,637 mailed Apr. 27, 2022.

U.S. Notice of Allowance for U.S. Appl. No. 17/658,991 mailed Oct. 25, 2022.

Non-Final Office Action Mailed Oct. 25, 2022 for U.S. Appl. No. 17/544,878, filed Dec. 7, 2021 (51 pages).

Final Office Action Mailed Oct. 4, 2022 for U.S. Appl. No. 16/682,960, filed Nov. 13, 2019 (34 pages).

Non-Final Office Action Mailed Oct. 6, 2022 for U.S. Appl. No. 17/317,611, filed May 7, 2021 (49 pages).

U.S. Notice of Allowance for U.S. Appl. No. 16/913,703 mailed Oct. 26, 2022.

(56)         References Cited

OTHER PUBLICATIONS

U.S. Notice of Allowance for U.S. Appl. No. 16/913,703 mailed Dec. 7, 2022 (5 pages).
U.S. Appl. No. 17/317,611, Notice of Allowance mailed Jan. 25, 2023.
U.S. Appl. No. 18/168,546, Non-Final Office Action Mailed Jul. 6, 2023, pp. 1-8.
U.S. Appl. No. 18/168,546, Notice of Allowance Mailed Jan. 4, 2024, pp. 1-5.
U.S. Appl. No. 17/555,325, Non-Final Office Action mailed Dec. 13, 2023, pp. 1-16.
Chinese Application No. 201910304218.9, Office Action mailed Dec. 7, 2023, with English translation pp. 1-27.
International Search Report and Written Opinion of the International Searching Authority for PCT International Application No. PCT/CN2023/134230 mailed on Jun. 14, 2024.
International Search Report and Written Opinion of the Interenational Searching Authority for PCT International Application No. PCT/CN2023/104899, mailed on Oct. 16, 2023, 18 pages with English translation.
CNIPA, First Office Action for Chinese Application No. 202211572179.9, mailed on Aug. 16, 2025, 14 pages with unofficial English translation.
Non-Final Office Action for U.S. Appl. No. 18/496,787, mailed on Dec. 31, 2025, 56 pages.

* cited by examiner

Shaft
911B

Worm
911A

Worm gear
915

904

906

908

Shaft
911B

Worm
911A

912

913

Worm gear
915

917

VEHICLE AND VEHICLE STEP APPARATUS WITH MULTIPLE DRIVE MOTORS

CROSS-REFERENCE TO RELATED APPLICATIONS

The present application is a continuation of and claims priority to and all benefits of U.S. patent application Ser. No. 17/555,325, filed Dec. 17, 2021, which is a continuation of and claims priority to and all benefits of U.S. patent application Ser. No. 15/931,474, filed May 13, 2020, now U.S. Pat. No. 11,208,043, which is a continuation of and claims priority to and all benefits of U.S. patent application Ser. No. 16/826,094, filed Mar. 20, 2020, now U.S. Pat. No. 11,021, 108, which is a continuation of and claims priority to and all benefits of U.S. patent application Ser. No. 16/655,149, filed Oct. 16, 2019, now U.S. Pat. No. 10,618,472, which is a continuation-in-part of and claims priority to and all benefits of U.S. patent application Ser. No. 15/200,940, filed Jul. 1, 2016, now U.S. Pat. No. 10,479,278, which claims priority to and all benefits of Chinese Patent Application 201510731518.7 filed on Oct. 30, 2015, Chinese Patent Application 201520860004.7 filed on Oct. 30, 2015, Chinese Patent Application 201510468824.6 filed on Aug. 4, 2015, Chinese Patent Application 201520576675.0 filed on Aug. 4, 2015, Chinese Patent Application 201510469324.4 filed on Aug. 4, 2015, and Chinese Patent Application 201520580148.7 filed on Aug. 4, 2015, all of which are hereby expressly incorporated herein by reference in their entirety.

TECHNICAL FIELD

Embodiments of the present technology generally relate to the field of vehicle accessories, and more particularly, to a vehicle and a vehicle step apparatus with multiple drive motors.

BACKGROUND

In relative art, a vehicle step apparatus of a vehicle uses a driving mechanism (with motor) and a driven mechanism (without motor) to drive a step to move. That is to say, the vehicle step apparatus uses one motor to drive the step to move. Thus, all of load is borne by the one motor, such that the load of the one motor is very high. Thus, a requirement for performance of the one motor is very high, a manufacturing difficulty, a manufacturing cost and a failure rate of the one motor are increased and a working life of the one motor is shortened.

Moreover, because the driving mechanism has a function of self-lock and the driven mechanism does not have a function of self-lock, the driven mechanism is easy to droop, especially when the step is very long.

SUMMARY

The present technology seeks to solve at least one of the technical problems existing in the related art. Accordingly, a first aspect of the present technology provides a vehicle step apparatus.

A second aspect of the present technology provides a vehicle, which includes the above vehicle step apparatus.

Embodiments of a first aspect of the present technology provide a vehicle step apparatus, including: a first extending and retracting device comprising a first mounting bracket, a first step bracket, and a first arm assembly coupled between the first mounting bracket and the first step bracket and configured to drive the first step bracket to move between a first extended position and a first retracted position; a second extending and retracting device comprising a second mounting bracket, a second step bracket, and a second arm assembly coupled between the second mounting bracket and the second step bracket and configured to drive the second step bracket to move between a second extended position and a second retracted position; a step mounted on the first step bracket and the second step bracket; a first permanent magnet direct current motor mounted on the first mounting bracket and coupled with the first arm assembly to drive the first arm assembly; and a second permanent magnet direct current motor mounted on the second mounting bracket and coupled with the second arm assembly to drive the second arm assembly.

With the vehicle step apparatus according to embodiments of the first aspect of the present technology, the vehicle step apparatus is low in manufacturing cost, low in failure rate, and long in working life, has good synchronization, and drooping of the vehicle step apparatus can be prevented.

Embodiments of a second aspect of the present technology provide a vehicle, including: a first extending and retracting device comprising a first mounting bracket, a first step bracket, and a first arm assembly coupled between the first mounting bracket and the first step bracket and configured to drive the first step bracket to move between a first extended position and a first retracted position; a second extending and retracting device comprising a second mounting bracket, a second step bracket, and a second arm assembly coupled between the second mounting bracket and the second step bracket and configured to drive the second step bracket to move between a second extended position and a second retracted position; a step mounted on the first step bracket and the second step bracket; a first permanent magnet direct current motor mounted on the first mounting bracket and having a first motor shaft coupled with the first arm assembly; and a second permanent magnet direct current motor mounted on the second mounting bracket and having a second motor shaft coupled with the second arm assembly.

The vehicle is low in manufacturing cost, low in failure rate, and long in working life.

DETAILED DESCRIPTION

Figure 1:
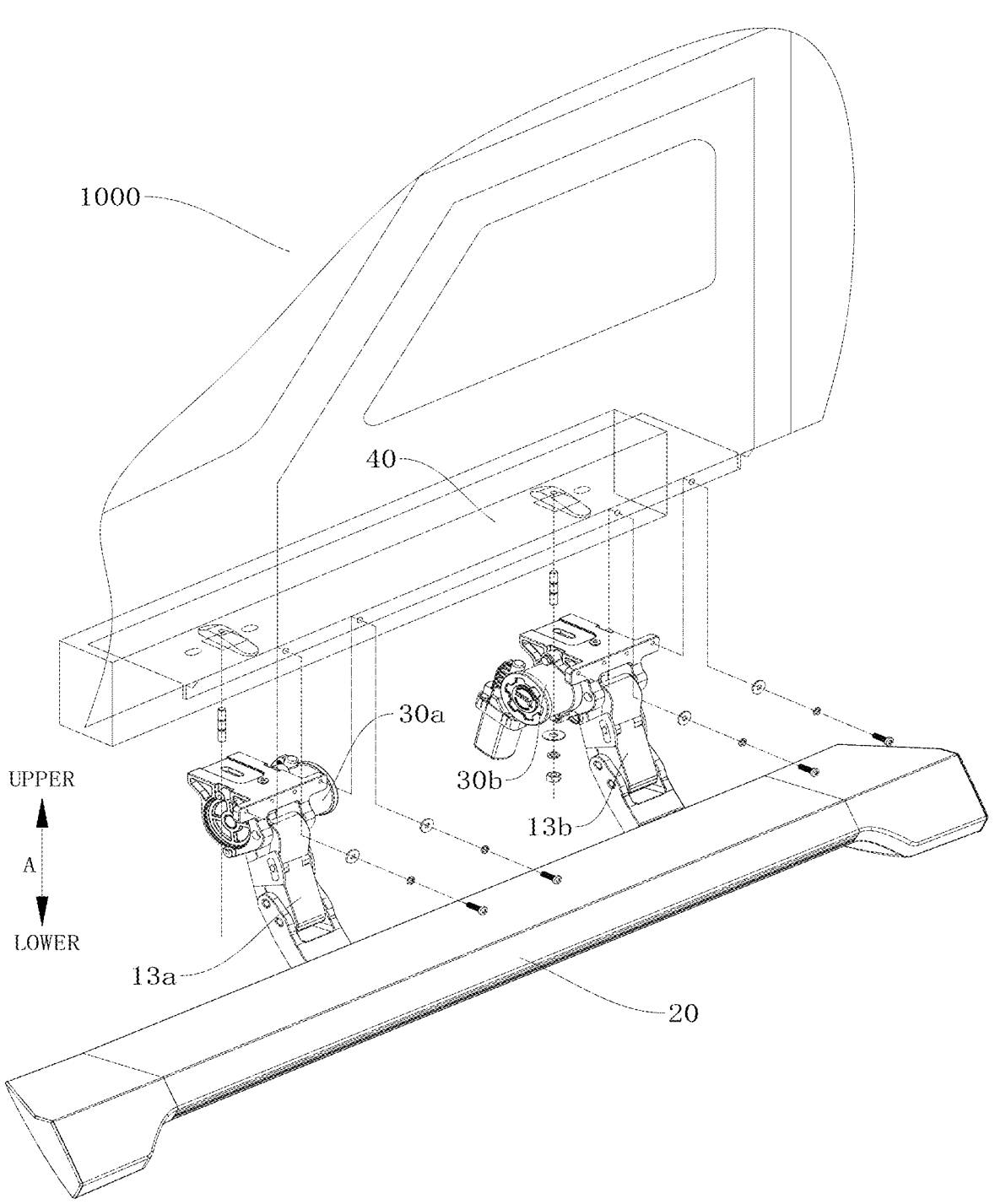
FIG. 1 is a partial exploded view of a vehicle according to an example embodiment of the present technology.

Reference will be made in detail to embodiments of the present technology. Embodiments of the present technology will be shown in drawings, in which the same or similar members and the members having same or similar functions are denoted by like reference numerals throughout the descriptions. The embodiments described herein according to drawings are explanatory and illustrative, not construed to limit the present technology.

The following description provides a plurality of embodiments or examples configured to achieve different structures of the present technology. In order to simplify the publication of the present technology, components and dispositions of the particular embodiment are described in the following, which are only explanatory and not construed to limit the present technology. In addition, the present technology may repeat the reference number and/or letter in different embodiments for the purpose of simplicity and clarity, and the repetition does not indicate the relationship of the plurality of embodiments and/or dispositions. Moreover, in description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In the description of the present technology, unless specified or limitation otherwise, it should be noted that, terms "mounted," "coupled," "coupled to," and "coupled with" may be understood broadly, such as electronic connection or mechanical connection, inner communication between two members, direct connection or indirect connection via intermediary. Those having ordinary skills in the art should understand the specific meanings in the present technology according to specific situations.

At present, the vehicle industry is increasingly developing, and vehicle design is becoming more and more detailed and humanized. For some vehicles with high chassis, it is quite difficult for passengers to get on and off, especially for the elderly, the weak, the sick and pregnant passengers, who have difficulty getting on and off high chassis vehicles by themselves.

In order to address these challenges and problems, conventional methods in existing applications is to add a step (also referred to as a pedal or running board) to each passenger entry side of the vehicle. Some examples include a fixed (non-moveable) pedal, whereas other conventional methods include providing a moveable pedal, such as a manually retractable pedal or an electrically retractable pedal. Today, mainstream electric retractable steps in the market are driven by a one-sided single motor. Yet, a single drive motor requires high motor performance, which results in high manufacturing difficulty and high cost.

In some aspects, a vehicle step apparatus and a vehicle having a vehicle step apparatus in accordance with the disclosed embodiments are described. A vehicle 1000 according to embodiments of the present technology will be described with reference to the drawings.

As shown in FIGS. 1-6, the vehicle 1000 according to embodiments of the present technology includes a chassis 40 and a vehicle step apparatus 100. The vehicle step apparatus 100 includes a first extending and retracting device 10a, a second extending and retracting device 10b, a step 20, a first permanent magnet direct current motor 30a and a second permanent magnet direct current motor 30b.

The first extending and retracting device 10a includes a first mounting bracket 11a, a first step bracket 12a and a first arm assembly 13a. The first arm assembly 13a is coupled between the first mounting bracket 11a and the first step bracket 12a and configured to drive the first step bracket 12a to move between a first extended position and a first retracted position. The first mounting bracket 11a is mounted on the chassis 40.

The second extending and retracting device 10b includes a second mounting bracket 11b, a second step bracket 12b and a second arm assembly 13b. The second arm assembly 13b is coupled between the second mounting bracket 11b and the second step bracket 12b and configured to drive the second step bracket 12b to move between a second extended position and a second retracted position. The second mounting bracket 11b is mounted on the chassis 40.

The step 20 is mounted on the first step bracket 12a and the second step bracket 12b. The first permanent magnet direct current motor 30a is mounted on the first mounting bracket 11a and coupled with the first arm assembly 13a to drive the first arm assembly 13a. The second permanent magnet direct current motor 30b is mounted on the second mounting bracket 11b and coupled with the second arm assembly 13b to drive the second arm assembly 13b.

In some embodiments, the first permanent magnet direct current motor 30a has a first motor shaft 32a coupled with the first arm assembly 13a. The second permanent magnet direct current motor 30b has a second motor shaft 32b coupled with the second arm assembly 13b.

Thus, the first step bracket 12a is driven to move between the first extended position and the first retracted position by the first permanent magnet direct current motor 30a via the first arm assembly 13a, and the second step bracket 12b is driven to move between the second extended position and the second retracted position by the second permanent magnet direct current motor 30b via the second arm assembly 13b. In other words, the vehicle 1000 uses the first permanent magnet direct current motor 30a and the second permanent magnet direct current motor 30b to drive the step 20 to extend and retract.

The vehicle 1000 uses two motors, i.e. the first permanent magnet direct current motor 30a and the second permanent magnet direct current motor 30b, to drive the step 20 to extend and retract, thus a load applied to the vehicle step apparatus 100 is distributed to the first permanent magnet direct current motor 30a and the second permanent magnet direct current motor 30b.

Thus, comparing to the vehicle step apparatus 100 employing only one motor, the load of the first permanent magnet direct current motor 30a is decreased so as to decrease a failure rate of the first permanent magnet direct current motor 30a, and the load of the second permanent magnet direct current motor 30b is decreased so as to decrease a failure rate of the second permanent magnet direct current motor 30b, thus prolonging a working life of the first permanent magnet direct current motor 30a and a working life of the second permanent magnet direct current motor 30b.

Because the load of the first permanent magnet direct current motor 30a is low, a requirement for performance of the first permanent magnet direct current motor 30a is decreased so as to lower a manufacturing difficulty and a manufacturing cost of the first permanent magnet direct current motor 30a.

Similarly, the load of the second permanent magnet direct current motor 30b is low, a requirement for performance of the second permanent magnet direct current motor 30b is decreased so as to lower a manufacturing difficulty and a manufacturing cost of the second permanent magnet direct current motor 30b.

Because both the first permanent magnet direct current motor 30a and the second permanent magnet direct current motor 30b have a function of self-lock, even the step 20 is very long, both the first permanent magnet direct current motor 30a and the second permanent magnet direct current motor 30b can be prevented from drooping.

Additionally, for the first permanent magnet direct current motor 30a and the second permanent magnet direct current motor 30b, a rotational speed is related to a load. Thus, a rotational speed of a motor will be decreased due to an increasing load, and a rotational speed of a motor will be increased due to a decreasing load.

Thus, a rotational speed of the first permanent magnet direct current motor 30a is dynamically balanced with a rotational speed of the second permanent magnet direct current motor 30b, so as to realize a synchronized motion of the first extending and retracting device 10a and the second extending and retracting device 10b.

Thus, the vehicle step apparatus 100 according to embodiments of the present technology is low in manufacturing cost, low in failure rate, long in working life, and has good synchronization, and the vehicle step apparatus 100 can be prevented from drooping.

As shown in FIG. 1, in some embodiments, the vehicle 1000 includes the chassis 40 and the vehicle step apparatus 100. The vehicle step apparatus 100 includes the first extending and retracting device 10a, the second extending and retracting device 10b, the step 20, the first permanent magnet direct current motor 30a and the second permanent magnet direct current motor 30b.

The first extending and retracting device 10a includes the first mounting bracket 11a, the first step bracket 12a and the first arm assembly 13a. The first mounting bracket 11a is mounted on the chassis 40. The first step bracket 12a is used to mount the step 20. The first arm assembly 13a is coupled between the first mounting bracket 11a and the first step bracket 12a and configured to drive the first step bracket 12a to move between the first extended position and the first retracted position.

The second extending and retracting device 10b includes the second mounting bracket 11b, the second step bracket 12b and the second arm assembly 13b. The second mounting bracket 11b is mounted on the chassis 40. The second step bracket 12b is used to mount the step 20. The second arm assembly 13b is coupled between the second mounting bracket 11b and the second step bracket 12b and configured to drive the second step bracket 12b to move between the second extended position and the second retracted position.

Both the first mounting bracket 11a and the second mounting bracket 11b may be mounted on the chassis 40 in well-known manner. The step 20 is mounted on the first step bracket 12a and the second step bracket 12b by known means.

As shown in FIG. 1, the first arm assembly 13a includes a plurality of arms pivotally connected together. At least one arm of the first arm assembly 13a is coupled with the first mounting bracket 11a, and at least one arm of the first arm assembly 13a is coupled with the first step bracket 12a.

As shown in FIG. 1, the second arm assembly 13b includes a plurality of arms pivotally connected together. At least one arm of the second arm assembly 13b is coupled with the second mounting bracket 11b, and at least one arm of the second arm assembly 13b is coupled with the second step bracket 12b.

Figure 5:
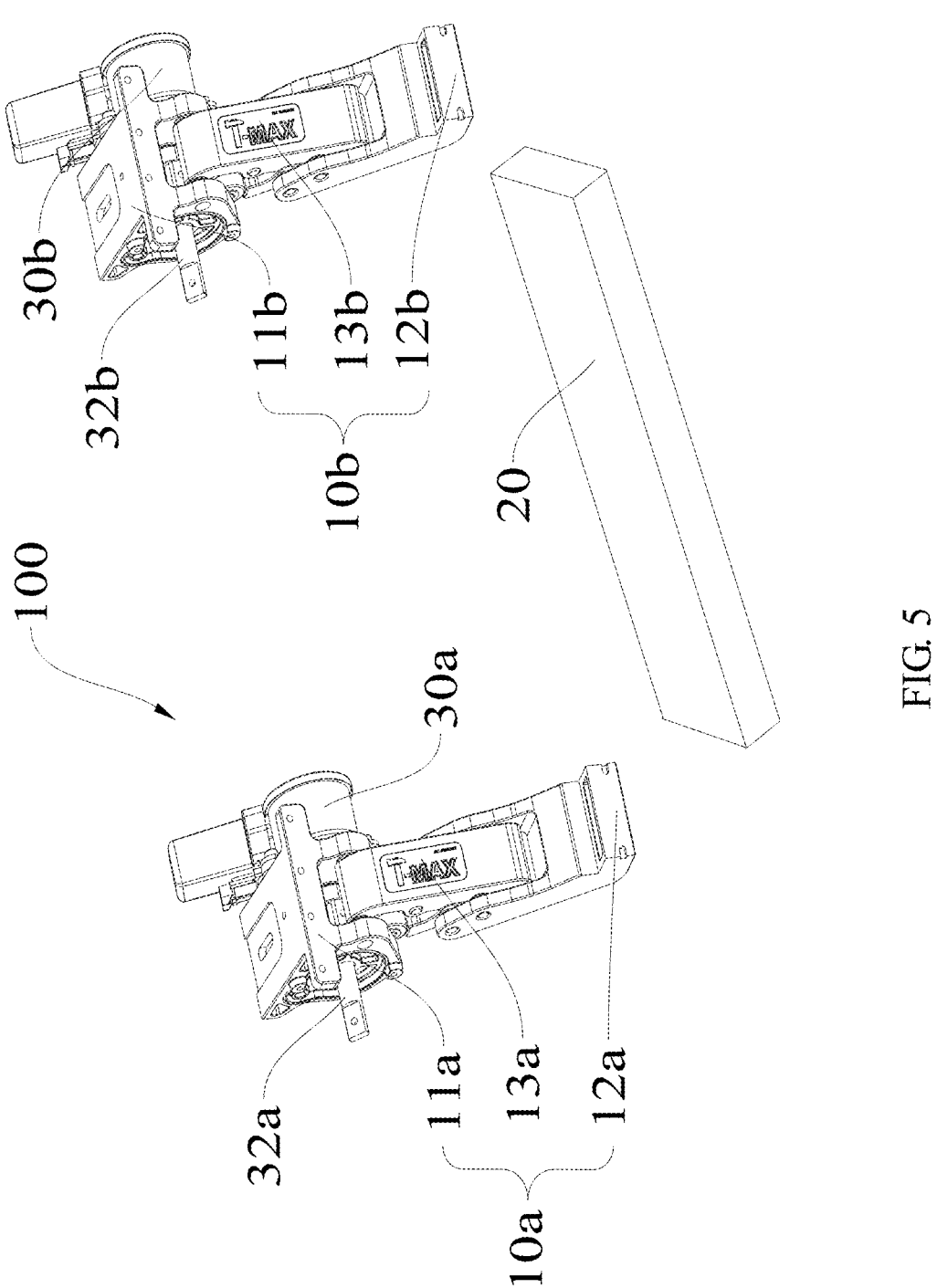
FIG. 5 is a schematic view of a vehicle step apparatus according to an example embodiment of the present technology.

The first permanent magnet direct current motor 30a is mounted on the first mounting bracket 11a, and the second permanent magnet direct current motor 30b is mounted on the second mounting bracket 11b. As shown in FIG. 5, the first permanent magnet direct current motor 30a has the first motor shaft 32a, and the second permanent magnet direct current motor 30b has the second motor shaft 32b. The first motor shaft 32a of the first permanent magnet direct current motor 30a is coupled with an arm of the first arm assembly 13a, and the second motor shaft 32b of the second permanent magnet direct current motor 30b is coupled with an arm of the second arm assembly 13b.

Figure 6:
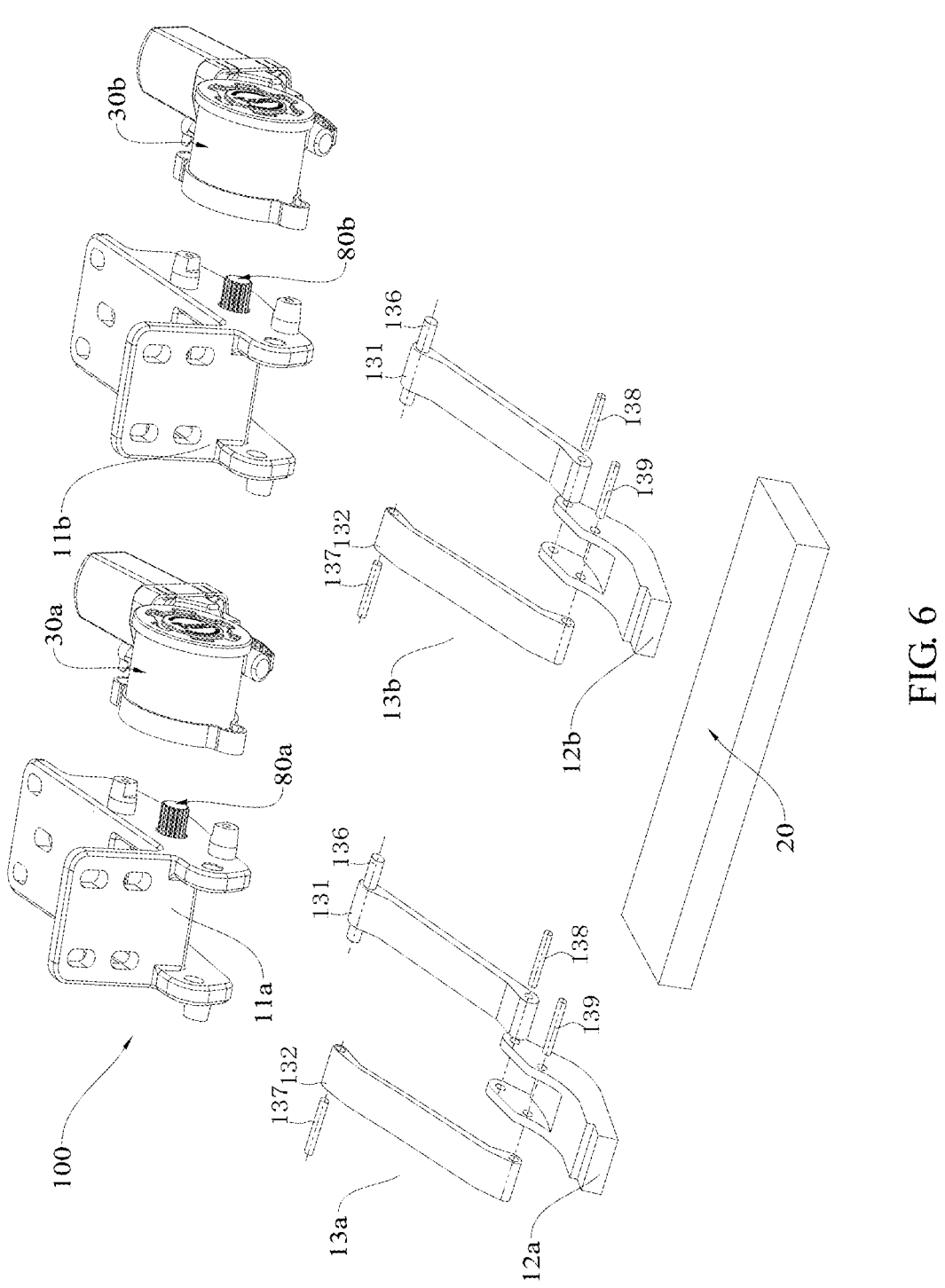
FIG. 6 is an exploded view of a vehicle step apparatus according to an example embodiment of the present technology.

As shown in FIG. 6, the vehicle step apparatus 100 further includes a first connection shaft 80a and a second connection shaft 80b. The first connection shaft 80a is coupled with both the first motor shaft 32a and the first arm assembly 13a, and the second connection shaft 80b is coupled with the second motor shaft 32b and the second arm assembly 13b. In other words, first motor shaft 32a is coupled with the first arm assembly 13a via a first connection shaft 80a, and the second motor shaft 32b is coupled with the second arm assembly 13b via a second connection shaft 80b.

Alternatively, the first extending and retracting device 10a is configured in the form of four-link mechanism 10a1, five-link mechanism 10a2 or six-link mechanism 10a3, and the second extending and retracting device 10b is configured in the form of the four-link mechanism 10a1, five-link mechanism 10a2 or six-link mechanism 10a3.

It can be understood that a structure of the second extending and retracting device 10b may be the same as that of the first extending and retracting device 10a. Thus, the first extending and retracting device 10a will be described below, and the second extending and retracting device 10b will be omitted here.

Figure 2:
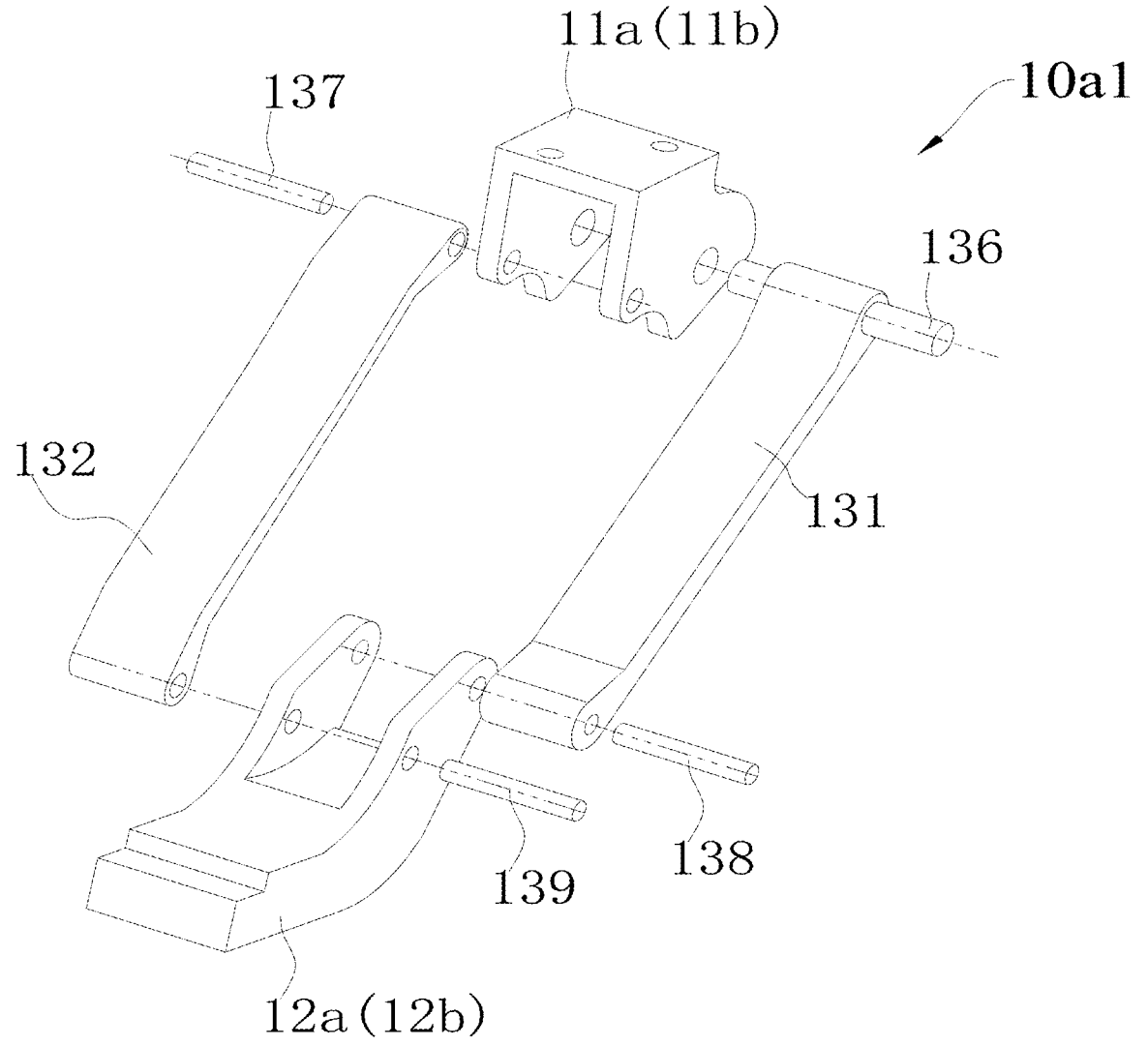
FIG. 2 is a schematic view of a first extending and retracting device and a second extending and retracting device of a vehicle step apparatus according to an example embodiment of the present technology, in which both the first extending and retracting device and the second extending and retracting device are in the form of four-link mechanism.

In an embodiment shown in FIG. 2, the first extending and retracting device 10a is in the form of four-link mechanism 10al, and includes the first mounting bracket 11a, the first step bracket 12a and the first arm assembly 13a. The first arm assembly 13a is coupled between the first mounting bracket 11a and the first step bracket 12a, and includes a first arm 131 and a second arm 132.

A first end (an upper end) of the first arm 131 is pivotally coupled with the first mounting bracket 11a via a first connection pin 136, and a second end (a lower end) of the first arm 131 is pivotally coupled with the first step bracket 12a via a second connection pin 137. A first end (an upper end) of the second arm 132 is pivotally coupled with the first mounting bracket 11a via a third connection pin 138, and a second end (a lower end) of the second arm 132 is pivotally coupled with the first step bracket 12a via a fourth connection pin 139.

The first motor shaft 32a of the first permanent magnet direct current motor 30a is coupled with one of the first arm 131 and the second arm 132. Thus, the first motor shaft 32a drives the one of the first arm 131 and the second arm 132 to rotate, thereby drives the first step bracket 12a to extend and retract.

Figure 3:
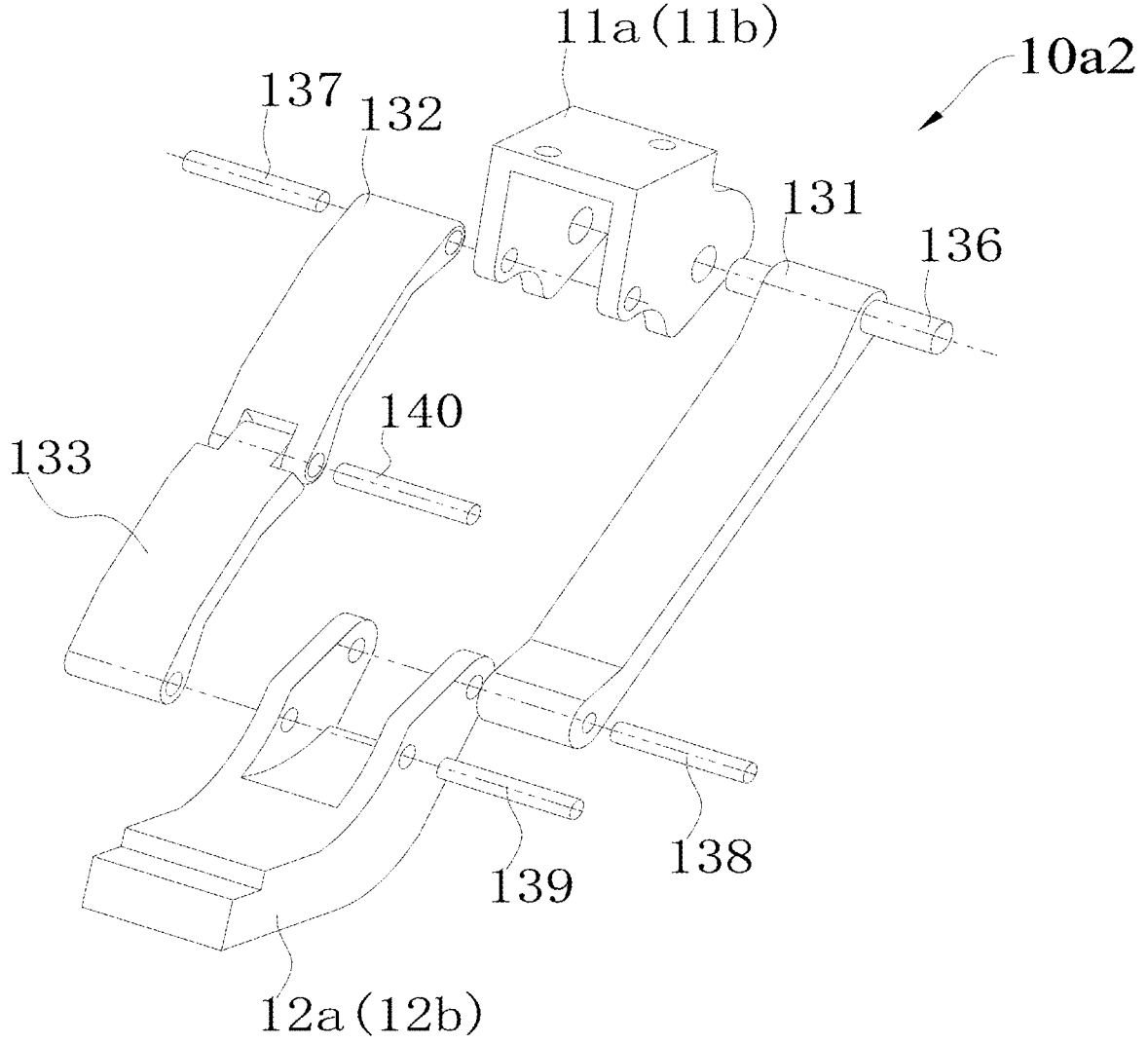
FIG. 3 is a schematic view of a first extending and retracting device and a second extending and retracting device of a vehicle step apparatus according to an example embodiment of the present technology, in which both the first extending and retracting device and the second extending and retracting device are in the form of five-link mechanism.

In an embodiment shown in FIG. 3, the first extending and retracting device 10a is in the form of five-link mechanism 10a2, and includes the first mounting bracket 11a, the first step bracket 12a and the first arm assembly 13a. The first arm assembly 13a is coupled between the first mounting bracket 11a and the first step bracket 12a, and includes a first arm 131, a second arm 132 and a third arm 133.

A first end (an upper end) of the first arm 131 is pivotally coupled with the first mounting bracket 11a via a first connection pin 136, and a second end (a lower end) of the first arm 131 is pivotally coupled with the first step bracket 12a via a second connection pin 137. A first end (an upper end) of the second arm 132 is pivotally coupled with the first mounting bracket 11a via a third connection pin 138, and a second end (a lower end) of the second arm 132 is pivotally coupled with a first end (an upper end) of the third arm 133 via a fifth connection pin 140. A second end (a lower end) of the third arm 133 is pivotally coupled with the first step bracket 12a via a fourth connection pin 139.

The first motor shaft 32a of the first permanent magnet direct current motor 30a is coupled with one of the first arm 131 and the second arm 132. Thus, the first motor shaft 32a drives the one of the first arm 131 and the second arm 132 to rotate, thereby drives the first step bracket 12a to extend and retract.

Figure 4:
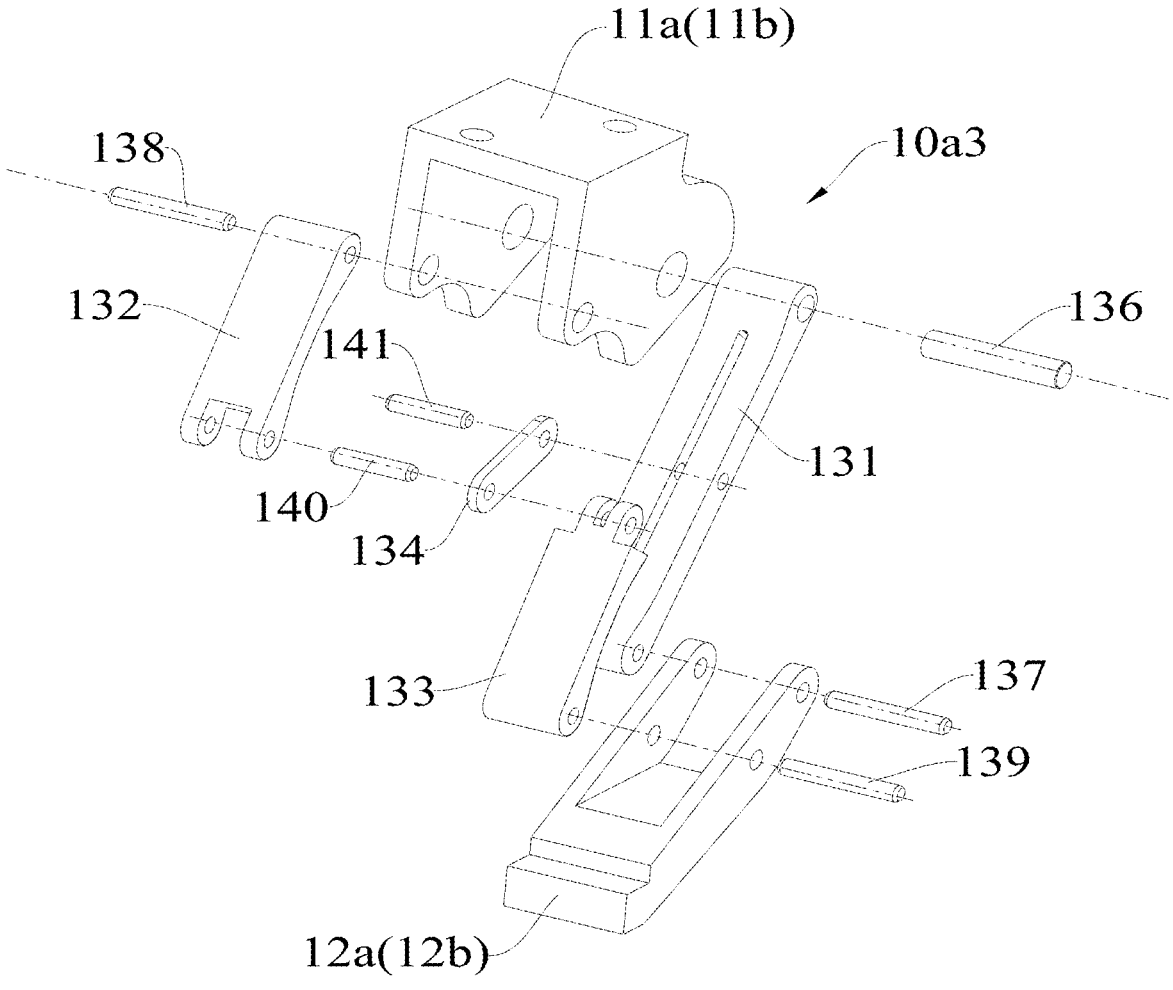
FIG. 4 is a schematic view of a first extending and retracting device and a second extending and retracting device of a vehicle step apparatus according to an example embodiment of the present technology, in which both the first extending and retracting device and the second extending and retracting device are in the form of six-link mechanism.

In an embodiment shown in FIG. 4, the first extending and retracting device 10a is in the form of six-link mechanism 10a3, and includes the first mounting bracket 11a, the first step bracket 12a and the first arm assembly 13a. The first arm assembly 13a is coupled between the first mounting bracket 11a and the first step bracket 12a, and includes a first arm 131, a second arm 132, a third arm 133 and a fourth arm 134.

A first end (an upper end) of the first arm 131 is pivotally coupled with the first mounting bracket 11a via a first connection pin 136, and a second end (a lower end) of the first arm 131 is pivotally coupled with the first step bracket 12a via a second connection pin 137. A first end (an upper end) of the second arm 132 is pivotally coupled with the first mounting bracket 11a via a third connection pin 138.

A first end (an upper end) of the third arm 133 is pivotally coupled with a second end (a lower end) of the second arm 132 via a fifth connection pin 140, and a second end (a lower end) of the third arm 133 is pivotally coupled with the first step bracket 12a via a fourth connection pin 139. A first end of the fourth arm 134 is pivotally coupled with both of the second end of the second arm 132 and the first end of the third arm 133, and a second end of the fourth arm 134 is pivotally coupled with a middle portion of the first arm 131 via a sixth connection pin 141.

The first motor shaft 32a of the first permanent magnet direct current motor 30a is coupled with one of the first arm 131 and the second arm 132. Thus, the first motor shaft 32a drives the one of the first arm 131 and the second arm 132 to rotate, thereby drives the first step bracket 12a to extend and retract.

The vehicle step apparatus according to other embodiments of the present technology will be described with reference to FIG. 7 and FIG. 8. The difference between the vehicle step apparatus according to other embodiments and the above-mentioned vehicle step apparatus 100 will be described in detail.

In some other embodiments, the vehicle step apparatus 100 includes the first extending and retracting device 10a, the second extending and retracting device 10b, the step 20, the first permanent magnet direct current motor 30a, the second permanent magnet direct current motor 30b, a first elastic member 50a and a second elastic member 50b.

The first elastic member 50a is configured to elastically deform so as to store energy when the first permanent magnet direct current motor 30a drives the first step bracket 12a to move towards the first extended position, and to release energy so as to assist the first permanent magnet direct current motor 30a to drive the first extending and retracting device 10a, i.e., to drive the first step bracket 12a, when the first permanent magnet direct current motor 30a drives the first step bracket 12a to move towards the first retracted position.

The second elastic member 50b is configured to elastically deform so as to store energy when the second permanent magnet direct current motor 30b drives the second step bracket 12b to move towards the second extended position, and to release energy so as to assist the second permanent magnet direct current motor 30b to drive the second extending and retracting device 10b, i.e., to drive the second step bracket 12b, when the second permanent magnet direct current motor 30b drives the second step bracket 12b to move towards the second retracted position.

The load of the first permanent magnet direct current motor 30a during driving the step 20 to retract is bigger than that of the first permanent magnet direct current motor 30a during driving the step 20 to extend, so that the working current of the first permanent magnet direct current motor 30a during driving the step 20 to retract is larger than that of the first permanent magnet direct current motor 30a during driving the step 20 to extend.

The load of the second permanent magnet direct current motor 30b during driving the step 20 to retract is bigger than that of the second permanent magnet direct current motor 30b during driving the step 20 to extend, so that the working current of the second permanent magnet direct current motor 30b during driving the step 20 to retract is larger than that of the second permanent magnet direct current motor 30b during driving the step 20 to extend.

For the vehicle step apparatus, when the step 20 is extending, the first motor shaft 32a drives the first elastic member 50a to move and the second motor shaft 32b drives the second elastic member 50*b* to move. Thus, both the first elastic member 50*a* and the second elastic member 50*b* are caused to be elastically deformed so as to store energy.

When the step 20 is retracting, the first elastic member 50*a* releases energy to assist the first permanent magnet direct current motor 30*a* in driving the first extending and retracting device 10*a*, so that the load and the working current of the first permanent magnet direct current motor 30*a* are decreased during driving the step 20 to retract. The second elastic member 50*b* releases energy to assist the second permanent magnet direct current motor 30*b* in driving the second extending and retracting device 10*b*, so that the load and the working current of the second permanent magnet direct current motor 30*b* are decreased during driving the step 20 to retract.

Thus, the working current of the first permanent magnet direct current motor 30*a* in the processes of driving the step 20 to retract is generally consistent with that of the first permanent magnet direct current motor 30*a* in the processes of driving the step 20 to extend; and the working current of the second permanent magnet direct current motor 30*b* in the processes of driving the step 20 to retract is generally consistent with that of the second permanent magnet direct current motor 30*b* in the processes of driving the step 20 to extend. Thus, the first permanent magnet direct current motor 30*a* and the second permanent magnet direct current motor 30*b* are protected effectively, and the working life of the first permanent magnet direct current motor 30*a* and that of the second permanent magnet direct current motor 30*b* are prolonged.

In some embodiments, the first elastic member 50*a* includes a first scroll spring, and the second elastic member 50*b* includes a second scroll spring. A first end 51*a* of the first scroll spring is fixed, and a second end 52*a* of the first scroll spring is driven by the first motor shaft 32*a* of the first permanent magnet direct current motor 30*a* so as to twist. A first end 51*b* of the second scroll spring is fixed, and a second end 52*b* of the second scroll spring is driven by the second motor shaft 32*b* of the second permanent magnet direct current motor 30*b* so as to twist.

Figure 7:
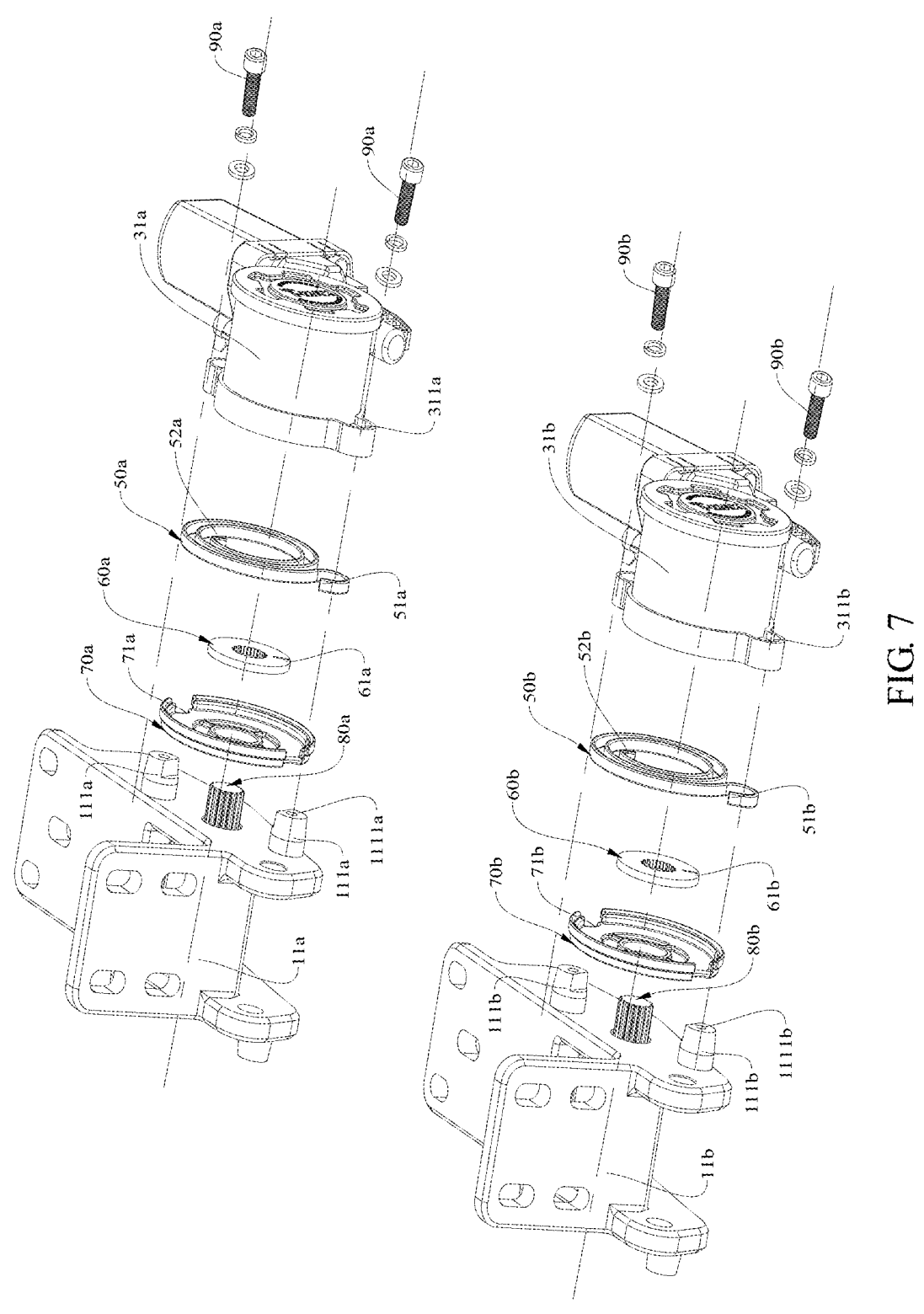
FIG. 7 is a partial exploded view of a vehicle step apparatus according to an example embodiment of the present technology.
Figure 8:
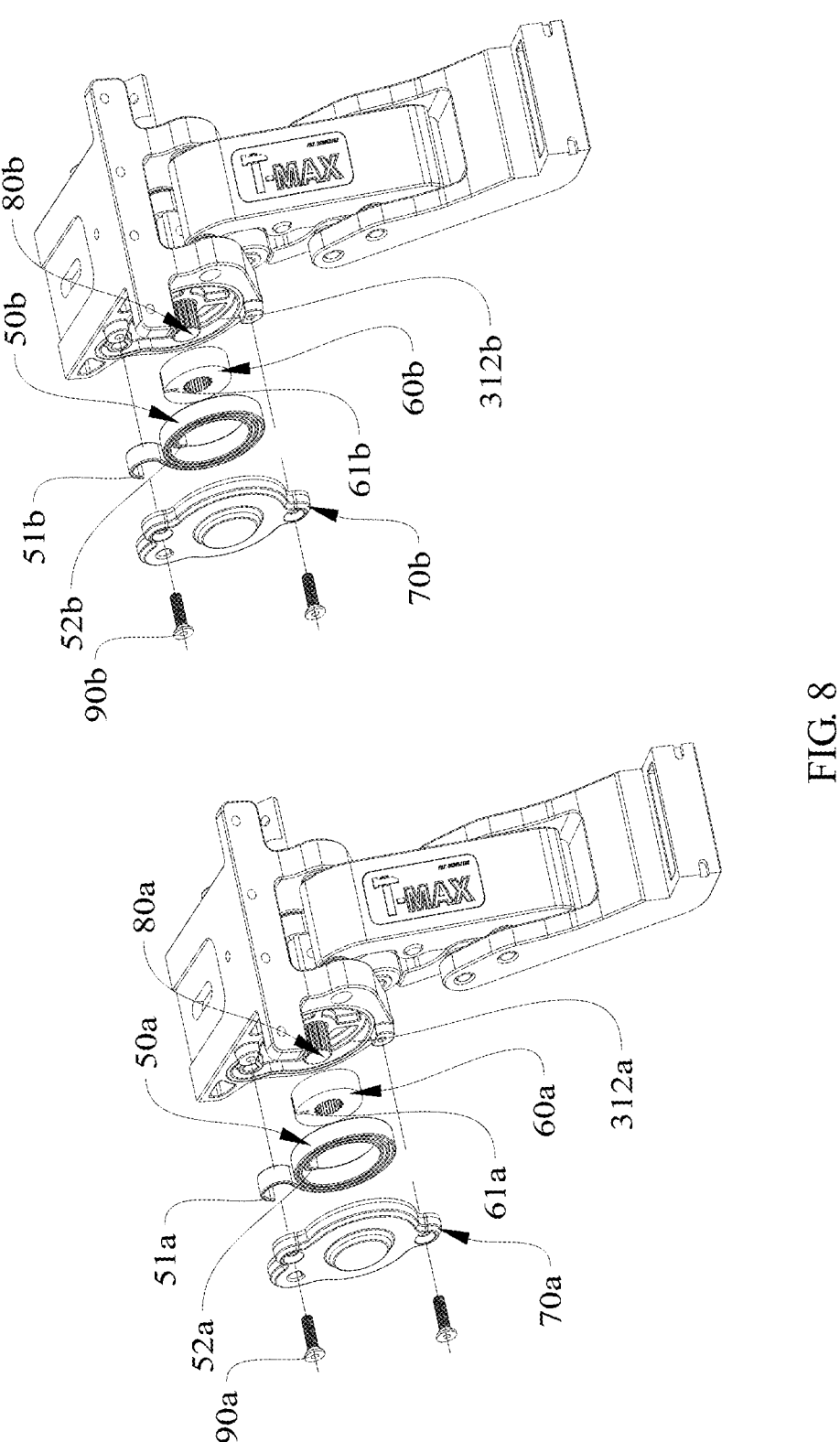
FIG. 8 is a partial exploded view of a vehicle step apparatus according to an example embodiment of the present technology.

As shown in FIG. 7 and FIG. 8, an end of the outermost ring of the first scroll spring is bent outwards to form the first end 51*a*, and an end of an innermost ring of the first scroll spring is bent inwards to form the second end 52*a*. The first end 51*a* includes the end of the outermost ring of the first scroll spring and a portion of the outermost ring coupled with the end of the outermost ring. The second end 52*a* includes the end of the innermost ring of the first scroll spring and a portion of the innermost ring coupled with the end of the innermost ring.

An end of the outermost ring of the second scroll spring is bent outwards to form the first end 51*b*, and an end of an innermost ring of the second scroll spring is bent inwards to form the second end 52*b*. The first end 51*b* includes the end of the outermost ring of the second scroll spring and a portion of the outermost ring coupled with the end of the outermost ring. The second end 52*b* includes the end of the innermost ring of the second scroll spring and a portion of the innermost ring coupled with the end of the innermost ring.

The first end 51*a* of the first scroll spring and the first end 51*b* of the second scroll spring are fixed with respect to the bracket 11*a* and the bracket 11*b*, respectively. When the step 20 is extending, the second end 52*a* of the first scroll spring rotates along with the first motor shaft 32*a* and is twisted tightly to store energy, and the second end 52*b* of the second scroll spring rotates along with the second motor shaft 32*b* and is twisted tightly to store energy.

When the step 20 is retracting, the second end 52*a* of the first scroll spring rotates along with the first motor shaft 32*a* and releases energy so as to assist the first permanent magnet direct current motor 30*a* to drive the first extending and retracting device 10*a* to retract, and the second end 52*b* of the second scroll spring rotates along with the second motor shaft 32*b* and releases energy so as to assist the second permanent magnet direct current motor 30*b* to drive the second extending and retracting device 10*b* to retract.

However, the present technology is not limited to this, both the first elastic member 50*a* and the second elastic member 50*b* may be a spring leaf, a disk spring or other units or parts easy to be deformed elastically.

As shown in FIG. 7 and FIG. 8, the vehicle step apparatus 100 further includes a first cover 70*a*, a first connection plate 60*a*, a second cover 70*b* and a second connection plate 60*b*.

A first recess 312*a* is formed in a first motor casing 31*a* of the first permanent magnet direct current motor 30*a*, and the first cover 70*a* covers the first recess 312*a* to define a first cavity. The first connection plate 60*a* is mounted within the first cavity and driven by the first motor shaft 32*a* of the first permanent magnet direct current motor 30*a* to rotate. The first scroll spring is mounted within the first cavity, the first end 51*a* of the first scroll spring is fixed in the first cover 70*a*, and the second end 52*a* of the first scroll spring is coupled with the first connection plate 60*a*.

A second recess 312*b* is formed in a second motor casing 31*b* of the second permanent magnet direct current motor 30*b*, and the second cover 70*b* covers the second recess 312*b* to define a second cavity. The second connection plate 60*b* is mounted within the second cavity and driven by the second motor shaft 32*b* of the second permanent magnet direct current motor 30*b* to rotate. The second scroll spring is mounted within the second cavity, the first end 51*b* of the second scroll spring is fixed in the second cover 70*b*, and the second end 52*b* of the second scroll spring is coupled with the second connection plate 60*b*.

As shown in FIG. 7 and FIG. 8, the first cover 70*a* is detachably fastened to the first motor casing 31*a* of the first permanent magnet direct current motor 30*a*. A first limitation notch 71*a* is formed in the first cover 70*a*, a first limitation column 111*a* is formed on the first mounting bracket 11*a*, the first limitation column 111*a* is fitted within the first limitation notch 71*a* to mount the first cover 70*a* on the first mounting bracket 11*a*. The first end 51*a* of the first scroll spring is fitted over the first limitation column 111*a*.

The second cover 70*b* is detachably fastened to the second motor casing 31*b* of the second permanent magnet direct current motor 30*b*. A second limitation notch 71*b* is formed in the second cover 70*b*, a second limitation column 111*b* is formed on the second mounting bracket 11*b*, the second limitation column 111*b* is fitted within the second limitation notch 71*b* to mount the second cover 70*b* on the second mounting bracket 11*b*. The first end 51*b* of the second scroll spring is fitted over the second limitation column 111*b*.

Specifically, the first connection plate 60*a* is configured as a substantially circular plate. The first connection plate 60*a* is disposed within the first cavity, and the first connection plate 60*a* defines a first surface opposing to the first recess 312*a* and a second surface opposing to the first cover 70*a*. The first connection plate 60*a* is coupled with the first motor shaft 32*a* directly or indirectly, so that the first connection plate 60*a* can rotate under the drive of the first motor shaft 32*a*. The first scroll spring is fitted over the first connection plate 60*a*, and the second end 52*a* of the first scroll spring is connected to the first connection plate 60a and rotates along with the first connection plate 60a in a same direction.

The second connection plate 60b is configured as a substantially circular plate. The second connection plate 60b is disposed within the second cavity, and the second connection plate 60b defines a first surface opposing to the second recess 312b and a second surface opposing to the second cover 70b. The second connection plate 60b is coupled with the second motor shaft 32b directly or indirectly, so that the second connection plate 60b can rotate under the drive of the second motor shaft 32b. The second scroll spring is fitted over the second connection plate 60b, and the second end 52b of the second scroll spring is connected to the second connection plate 60b and rotates along with the second connection plate 60b in a same direction.

Therefore, the first scroll spring and the second scroll spring can be integrated in the first permanent magnet direct current motor 30a and the second permanent magnet direct current motor 30b respectively so as to decrease transmission loss and make the structure of the vehicle step apparatus 100 more compactly.

The first connection plate 60a, the second connection plate 60b, the first cover 70a, the second cover 70b, the first recess 312a and the second recess 312b may have a circular shape or an oval shape.

A number of each of the first limitation notch 71a, the first limitation column 111a, the second limitation notch 71b and the second limitation column 111b is not limited to two, and when there are more than two first limitation notches 71a and two second limitation notches 71b, the first limitation notches 71a are provided and evenly spaced apart from each other along a circumferential direction of the first cover 70a, and the second limitation notches 71b are provided and evenly spaced apart from each other along a circumferential direction of the second cover 70b.

A first catch groove 61a is formed in an outer circumferential surface of the first connection plate 60a, and the second end 52a of the first scroll spring is inserted into and fitted within the first catch groove 61a. The first connection plate 60a is fitted over the first connection shaft 80a and coupled with the first connection shaft 80a via spline coupling.

A second catch groove 61b is formed in an outer circumferential surface of the second connection plate 60b, and the second end 52b of the second scroll spring is inserted into and fitted within the second catch groove 61b. The second connection plate 60b is fitted over the second connection shaft 80b and coupled with the second connection shaft 80b via spline coupling.

As shown in FIG. 7, the first catch groove 61a extends along a radial direction of the first connection plate 60a, and the second catch groove 61b extends along a radial direction of the second connection plate 60b. A center of each of the first connection plate 60a, the first motor shaft 32a, the second connection plate 60b and the second motor shaft 32b has a spline hole. Each of the first connection shaft 80a and the second connection shaft 80b has an external spline.

The first motor shaft 32a drives the first connection shaft 80a and the first connection plate 60a to rotate, and the second end 52a of the first scroll spring fixed on the first connection plate 60a rotates along with the first connection plate 60a. The second motor shaft 32b drives the second connection shaft 80b and the second connection plate 60b to rotate, and the second end 52b of the second scroll spring fixed on the second connection plate 60b rotates along with the second connection plate 60b.

Thus, the first scroll spring and the second scroll spring are gradually rolled up tightly, thus resulting in a simple and compact structure. In addition, the first connection shaft 80a is coupled with the first motor shaft 32a and the first connection plate 60a via spline connection so as to ensure driving force transmission and make installation and disassembly to be easy, and the second connection shaft 80b is coupled with the second motor shaft 32b and the second connection plate 60b via spline connection so as to ensure driving force transmission and make installation and disassembly to be easy.

As shown in FIG. 7, a first mounting hole 311a is formed in the first motor casing 31a, and the first limitation column 111a is passed through the first mounting hole 311a. A first threaded hole 1111a is formed in the first limitation column 111a, and the first permanent magnet direct current motor 30a is mounted on the first mounting bracket 11a via a first bolt 90a fitted within the first threaded hole 1111a.

A second mounting hole 311b is formed in the second motor casing 31b, and the second limitation column 111b is passed through the second mounting hole 311b. A second threaded hole 1111b is formed in the second limitation column 111b, and the second permanent magnet direct current motor 30b is mounted on the second mounting bracket 11b via a second bolt 90b fitted within the second threaded hole 1111b.

The first limitation column 111a is passed through the first limitation notch 71a and bears against the first motor casing 31a. The first mounting hole 311a of the first motor casing 31a is opposite to the first threaded hole 1111a of the first limitation column 111a. The first bolt 90a is passed through the first mounting hole 311a and is fitted within the first threaded hole 1111a so as to mount the first motor casing 31a to the first mounting bracket 11a.

The second limitation column 111b is passed through the second limitation notch 71b and bears against the second motor casing 31b. The second mounting hole 311b of the second motor casing 31b is opposite to the second threaded hole 1111b of the second limitation column 111b. The second bolt 90b is passed through the second mounting hole 311b and is fitted within the second threaded hole 1111b so as to mount the second motor casing 31b to the second mounting bracket 11b.

Some example embodiments in accordance with the disclosed vehicle step apparatus are described below.

In an example embodiment in accordance with the present technology (example A1), a motorized step for a vehicle includes a first extending and retracting device comprising a first mounting bracket attachable to a chassis of a vehicle, a first step bracket, and a first arm assembly coupled to the first mounting bracket and the first step bracket and configured to drive the first step bracket to move between a first extended position and a first retracted position; a second extending and retracting device comprising a second mounting bracket attachable to the chassis of the vehicle, a second step bracket, and a second arm assembly coupled to the second mounting bracket and the second step bracket and configured to drive the second step bracket to move between a second extended position and a second retracted position, wherein the second extended position is aligned with the first extended position, and wherein the second retracted position is aligned with the first retracted position; a step coupled to the first step bracket and the second step bracket; a first permanent magnet direct current motor coupled with the first arm assembly to drive the first arm assembly; and a second permanent magnet direct current motor coupled with the second arm assembly to drive the second arm assembly, wherein the first permanent magnet direct current motor and the second permanent magnet direct current motor are configured to drive the first arm assembly and the second arm assembly, respectively, in unison and with synchronized motion as the step extends and retracts.

Example A2 includes the motorized vehicle step of example A1, wherein the first permanent magnet direct current motor comprises a first motor shaft that is coupled with a first connection shaft of the first arm assembly, and wherein the second permanent magnet direct current motor comprises a second motor shaft that is coupled with a second connection shaft of the second arm assembly.

Example A3 includes the motorized vehicle step of example A2, including a first elastic member configured to elastically deform so as to store energy when the first permanent magnet direct current motor drives the first step bracket to move towards the first extended position, and to release energy so as to assist the first permanent magnet direct current motor to drive the first extending and retracting device when the first permanent magnet direct current motor drives the first step bracket to move towards the first retracted position; and a second elastic member configured to elastically deform so as to store energy when the second permanent magnet direct current motor drives the second step bracket to move towards the second extended position, and to release energy so as to assist the second permanent magnet direct current motor to drive the second extending and retracting device when the second permanent magnet direct current motor drives the second step bracket to move towards the second retracted position.

Example A4 includes the motorized vehicle step of example A3, wherein the first elastic member comprises a first spring defining a fixed first end and a second end driven by the first motor shaft of the first permanent magnet direct current motor so as to change shape; wherein the second elastic member comprises a second spring defining a fixed first end and a second end driven by the second motor shaft of the second permanent magnet direct current motor so as to change shape.

Example A5 includes the motorized vehicle step of example A4, wherein the first spring and the second spring each include one of a scroll spring, a spring leaf, or a disk spring.

Example A6 includes the motorized vehicle step of example A4, wherein the first spring includes a first scroll spring, and the second spring includes a second scroll spring, the motorized vehicle step further including a first cover and a first connection plate, wherein a first recess is formed in a casing of the first permanent magnet direct current motor, and the first cover covers the first recess to define a first cavity, the first connection plate is mounted within the first cavity and driven by the first motor shaft of the first permanent magnet direct current motor to rotate, wherein the first scroll spring is mounted within the first cavity, the first end of the first scroll spring is fixed in the first cover, and the second end of the first scroll spring is coupled with the first connection plate; and a second cover and a second connection plate, wherein a second recess is formed in a casing of the second permanent magnet direct current motor, and the second cover covers the second recess to define a second cavity, the second connection plate is mounted within the second cavity and driven by the second motor shaft of the second permanent magnet direct current motor to rotate, wherein the second scroll spring is mounted within the second cavity, the first end of the second scroll spring is fixed in the second cover, and the second end of the second scroll spring is coupled with the second connection plate.

Example A7 includes the motorized vehicle step of example A1, wherein the first extending and retracting device includes a four-link mechanism, where the first arm assembly includes a first arm defining a first end pivotally coupled with the first mounting bracket, and a second end pivotally coupled with the first step bracket; and a second arm defining a first end pivotally coupled with the first mounting bracket, and a second end pivotally coupled with the first step bracket, wherein the first permanent magnet direct current motor is coupled with one of the first arm or the second arm.

Example A8 includes the motorized vehicle step of example A1, wherein the first extending and retracting device includes a five-link mechanism, where the first arm assembly includes a first arm defining a first end pivotally coupled with the first mounting bracket, and a second end pivotally coupled with the first step bracket; a second arm defining a first end pivotally coupled with the first mounting bracket, and a second end; and a third arm defining a first end pivotally coupled with the second end of the second arm, and a second end pivotally coupled with the first step bracket, wherein the first permanent magnet direct current motor is coupled with one of the first arm or the second arm.

Example A9 includes the motorized vehicle step of example A1, wherein the first extending and retracting device includes a six-link mechanism, where the first arm assembly includes a first arm defining a first end pivotally coupled with the first mounting bracket, and a second end pivotally coupled with the first step bracket; a second arm defining a first end pivotally coupled with the first mounting bracket, and a second end; a third arm defining a first end pivotally coupled with the second end of the second arm, and a second end pivotally coupled with the first step bracket; and a fourth arm defining a first end pivotally coupled with both of the second end of the second arm and the first end of the third arm, and a second end pivotally coupled with a middle portion of the first arm, wherein the first permanent magnet direct current motor is coupled with one of the first arm or the second arm.

Example A10 includes the motorized vehicle step of example A1, wherein the first permanent magnet direct current motor is coupled to the first mounting bracket, and the second permanent magnet direct current motor is coupled to the second mounting bracket.

Example A11 includes the motorized vehicle step of example A1, wherein the first permanent magnet direct current motor and the second permanent magnet direct current motor are operable to self-lock.

Example A12 includes the motorized vehicle step of example A1, wherein the first permanent magnet direct current motor and the second permanent magnet direct current motor are operable to drive the first arm assembly and the second arm assembly, respectively, at rotational speed that is related to a load, such that the rotational speed will be decreased due to an increasing load and the rotational speed will be increased due to a decreasing load.

In an example embodiment in accordance with the present technology (example A13), a motorized step for a vehicle includes a dual drive mechanism assembly, comprising a first extending and retracting device and a second extending and retracting device, the first extending and retracting device comprising a first mounting bracket attachable to a chassis of a vehicle, a first step bracket, and a first arm assembly coupled to the first mounting bracket and the first step bracket and configured to drive the first step bracket to move between a first extended position and a first retracted position, the second extending and retracting device comprising a second mounting bracket attachable to the chassis of the vehicle, a second step bracket, and a second arm assembly coupled to the second mounting bracket and the second step bracket and configured to drive the second step bracket to move between a second extended position and a second retracted position, wherein the second extended position is aligned with the first extended position, and wherein the second retracted position is aligned with the first retracted position; a step coupled to the first step bracket and the second step bracket; and a dual motor assembly comprising a first motor and a second motor, the first motor coupled with the first arm assembly to drive the first arm assembly, and the second motor coupled with the second arm assembly to drive the second arm assembly, wherein the dual motor assembly is operable to cause the step to extend and retract in a balanced orientation where neither side of the step is drooping with respect to the other based on the first motor and the second motor configured to drive the first arm assembly and the second arm assembly, respectively, in unison and with synchronized motion.

Example A14 includes the motorized vehicle step of example A13, wherein the dual drive mechanism assembly includes a four-link mechanism for one or both of the first extending and retracting device and the second extending and retracting device, wherein the four-link mechanism includes a first arm defining a first end to pivotally couple with a mounting bracket of the dual drive mechanism assembly, and a second end to pivotally couple with a step bracket of the dual drive mechanism assembly; and a second arm defining a first end to pivotally couple with the mounting bracket, and a second end to pivotally couple with the step bracket, wherein one of the first arm or the second arm is coupled with a motor of the dual motor assembly.

Example A15 includes the motorized vehicle step of example A13, wherein the dual drive mechanism assembly includes a five-link mechanism for one or both of the first extending and retracting device and the second extending and retracting device, wherein the five-link mechanism includes a first arm defining a first end to pivotally couple with a mounting bracket of the dual drive mechanism assembly, and a second end to pivotally couple with a step bracket of the dual drive mechanism assembly; a second arm defining a first end to pivotally couple with the mounting bracket, and a second end; and a third arm defining a first end pivotally coupled with the second end of the second arm, and a second end to pivotally couple with the step bracket, wherein one of the first arm or the second arm is coupled with a motor of the dual motor assembly.

Example A16 includes the motorized vehicle step of example A13, wherein the dual drive mechanism assembly includes a six-link mechanism for one or both of the first extending and retracting device and the second extending and retracting device, wherein the six-link mechanism includes a first arm defining a first end to pivotally couple with a mounting bracket of the dual drive mechanism assembly, and a second end to pivotally couple with a step bracket of the dual drive mechanism assembly; a second arm defining a first end to pivotally couple with the mounting bracket, and a second end; a third arm defining a first end pivotally coupled with the second end of the second arm, and a second end to pivotally couple with the step bracket; and a fourth arm defining a first end pivotally coupled with both of the second end of the second arm and the first end of the third arm, and a second end pivotally coupled with a middle portion of the first arm, wherein one of the first arm or the second arm is coupled with a motor of the dual motor assembly.

Example A17 includes the motorized vehicle step of example A13, wherein the first motor includes a first motor shaft that is coupled with a first connection shaft of the first arm assembly, and wherein the second motor comprises a second motor shaft that is coupled with a second connection shaft of the second arm assembly.

Example A18 includes the motorized vehicle step of example A17, including a first elastic member configured to elastically deform so as to store energy when the first motor drives the first step bracket to move towards the first extended position, and to release energy so as to assist the first motor to drive the first extending and retracting device when the first motor drives the first step bracket to move towards the first retracted position; and a second elastic member configured to elastically deform so as to store energy when the second motor drives the second step bracket to move towards the second extended position, and to release energy so as to assist the second motor to drive the second extending and retracting device when the second motor drives the second step bracket to move towards the second retracted position.

Example A19 includes the motorized vehicle step of example A18, wherein the first elastic member comprises a first spring defining a fixed first end and a second end driven by the first motor shaft of the first motor so as to change shape; wherein the second elastic member comprises a second spring defining a fixed first end and a second end driven by the second motor shaft of the second motor so as to change shape.

Example A20 includes the motorized vehicle step of example A19, wherein the first spring and the second spring each include one of a scroll spring, a spring leaf, or a disk spring.

In some aspects, a vehicle step apparatus with dual drive motors in accordance with the disclosed embodiments is described.

Motorized vehicle steps typically must carry substantial loads and therefore may be made of materials of relatively large weight and size, thereby putting demands on the motor. Conventional motorized vehicle step devices may include multiple extension-retraction devices coupled to the step with one motor driving one of the extension-retraction devices. A single drive motor requires high motor performance, which results in high manufacturing difficulty and high cost.

Conventional single motor-driven vehicle step devices do not provide durability and reliability of the motorized vehicle step, particularly after continuous uses. For example, after a conventional single motor-driven vehicle step device is used for a period of time (e.g., hundreds of extensions and retractions), the driven end of the step may sag relative to the motor-driving end of the step, which can create a larger gap between the driven end of the step and the vehicle body than the gap between the driving end of the step and the vehicle body, thus affecting the appearance and performance of the vehicle step device. Furthermore, when the driven end is not locked by the motor assembly, the failure rate of the motor of the motorized vehicle step is increased after the vehicle step vibrates for a long time, and the service life of the product is shortened. Yet it is challenging to provide a motorized vehicle step device that can employ multiple (e.g., two or more) motors to distribute the drive power for extending and retracting the step that sufficiently addresses and solves these problems with conventional systems.

Disclosed are devices and methods for driving a vehicle step assembly by multiple (e.g. two or more) motors by a motor assembly capable of self-locking of the of the vehicle step assembly.

As shown in FIGS. 9-13, a vehicle step apparatus 100' according to embodiments of the present technology includes a step 20' and a first extending and retracting device 10a' and a second extending and retracting device 10b', which are driven by a first motor assembly 900a and a second motor assembly 900b, respectively, each capable of self-locking and sometimes referred to as self-locking motor assemblies. In some embodiments, the first motor assembly 900a and the second motor assembly 900b each include a worm mechanism including a worm gear and worm to drive the worm gear based on rotation of the worm rotated by a worm shaft coupled to a motor of the respective motor assembly, where the worm is structured to have a lead angle greater than the friction angle to create a self-locking effect of the respective motor assembly, such that only the motor can drive rotation of the shaft in either rotational directions while preventing the shaft from rotation in the other non-driven rotational direction. In this manner, the first motor assembly 900a and the second motor assembly 900b are each capable of self-locking in reversible directions, e.g., reverse self-locking, depending on which direction the motor is driving the worm mechanism. This is illustrated in greater detail in FIGS. 9-13.

Figure 9:
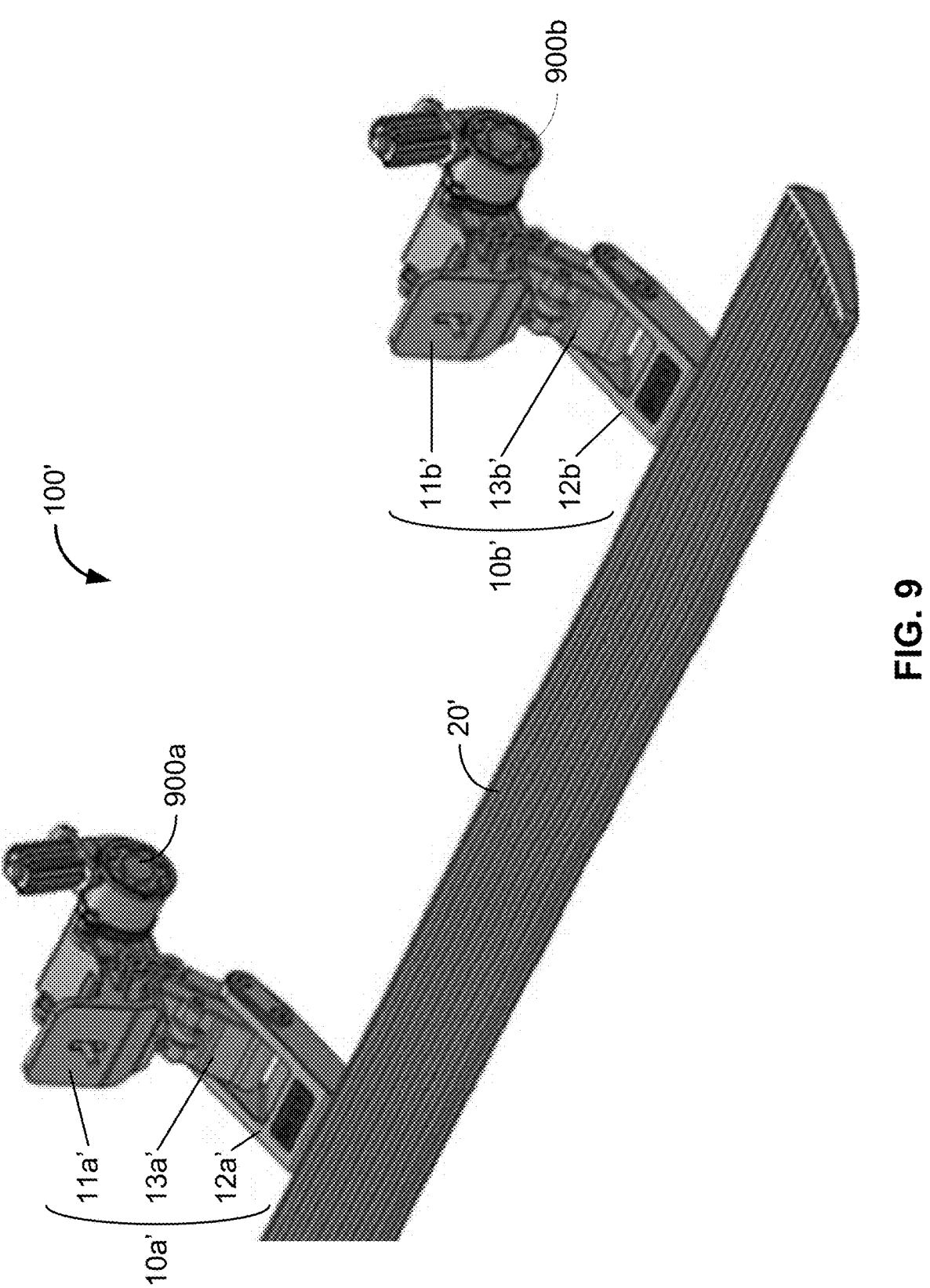
FIG. 9 is a schematic view of a vehicle step apparatus according to an example embodiment of the present technology.

FIG. 9 shows a schematic view of the vehicle step apparatus 100'. The first extending and retracting device 10a' includes a first mounting bracket 11a' that is attachable to the underside of a vehicle (e.g., chassis), a first step bracket 12a' and a first arm assembly 13a', where the first arm assembly 13a' is coupled between the first mounting bracket 11a' and the first step bracket 12a' and configured to drive the first step bracket 12a' to move between a first extended position and a first retracted position. Similarly, the second extending and retracting device 10b' includes a second mounting bracket 11b' that is attachable to the underside of a vehicle (e.g., chassis), a second step bracket 12b' and a second arm assembly 13b', where the second arm assembly 13b' is coupled between the second mounting bracket 11b' and the second step bracket 12b' and configured to drive the second step bracket 12b' to move between a second extended position and a second retracted position. In operations of the vehicle step apparatus 100', the respective arm assemblies 13a' and 13b' of the first extending and retracting device 10a' and the second extending and retracting device 10b' are driven in synchrony such that the respective step brackets 12a' and 12b' are aligned with each other during movement and in the first extended position and the second extended position, respectively.

The first self-locking motor assembly 900a is coupled with an arm of the first arm assembly 13a' (via a shaft, not shown), and the second self-locking motor assembly 900b is coupled with an arm of the second arm assembly 13b' (via a shaft, not shown). The first self-locking motor assembly 900a is able to mount on the first mounting bracket 11a', and the second self-locking motor assembly 900b is able to mount on the second mounting bracket 11b'.

Each extending and retracting device 10a' and 10b' of the vehicle step apparatus 100' is equipped with a drive motor assembly capable of a reverse self-locking functionality based on configuration of the motor assembly. In implementations, for example, after receiving a movement instruction (e.g., from a controller device), both of the self-locking motor assemblies 900a and 900b operate synchronously, driving the respective extending and retracting devices 10a' and 10b' to operate according to a predetermined trajectory, thus driving the step 20 to operate between the extended position and the retracted position. When the respective extending and retracting devices 10a' and 10b' are in the retracted state, due to the reverse self-locking function of the motor assembly, the step 20 is located in the retracted position and held into the position without any further movement, e.g., the step 20 does not vibrate or result in sagging or drooping after several usages. For example, the reverse self-locking to maintain the step 20 in the retracted position (without vibrating, sagging or drooping) and the consistency in movement can occur even after thousands of operations of the vehicle step apparatus 100' to move the step 20 between the extended and retracted positions.

Figure 10:
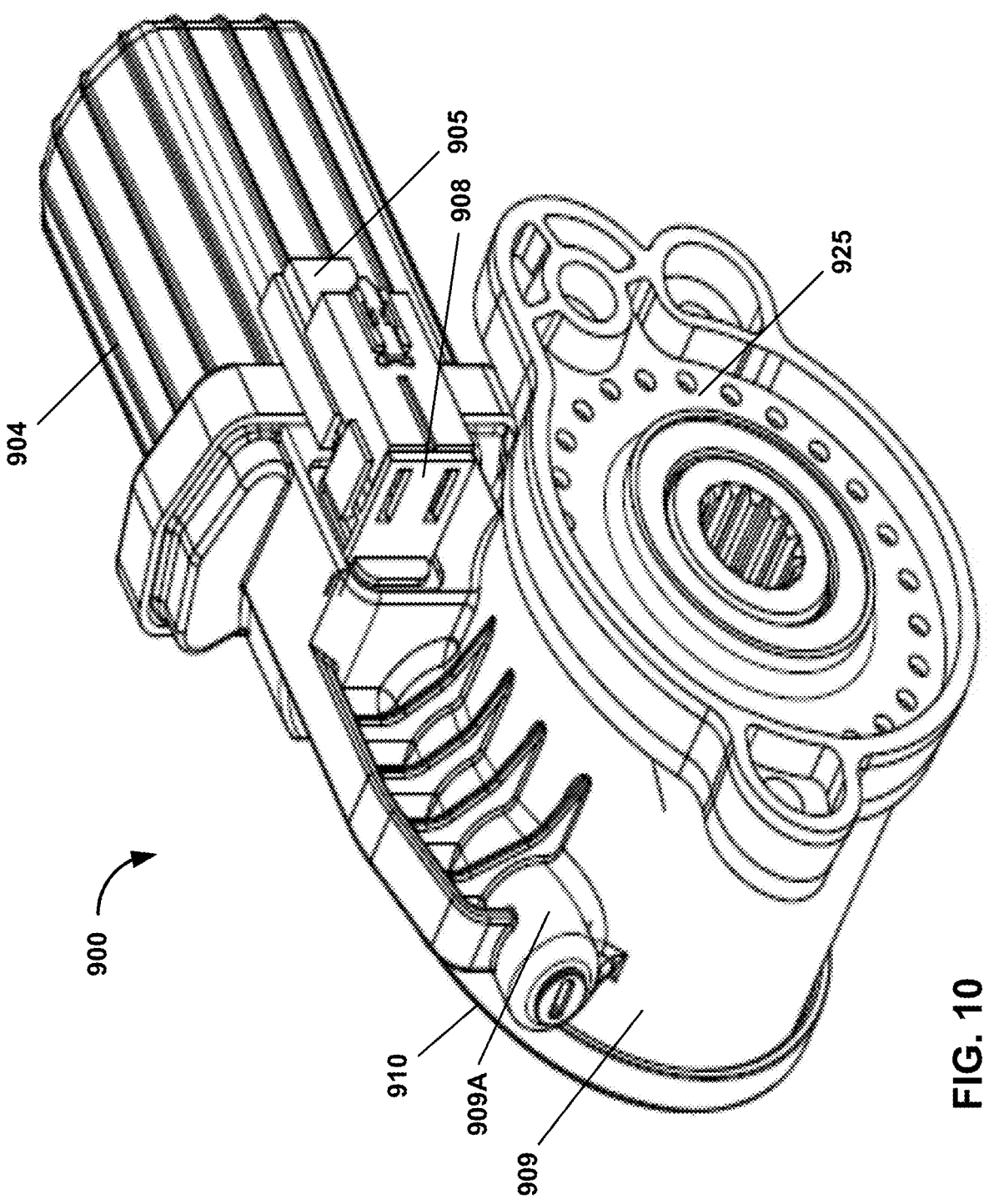
FIG. 10 is a schematic diagram of a self-locking motor assembly according to an example embodiment of the present technology.
Figure 11:
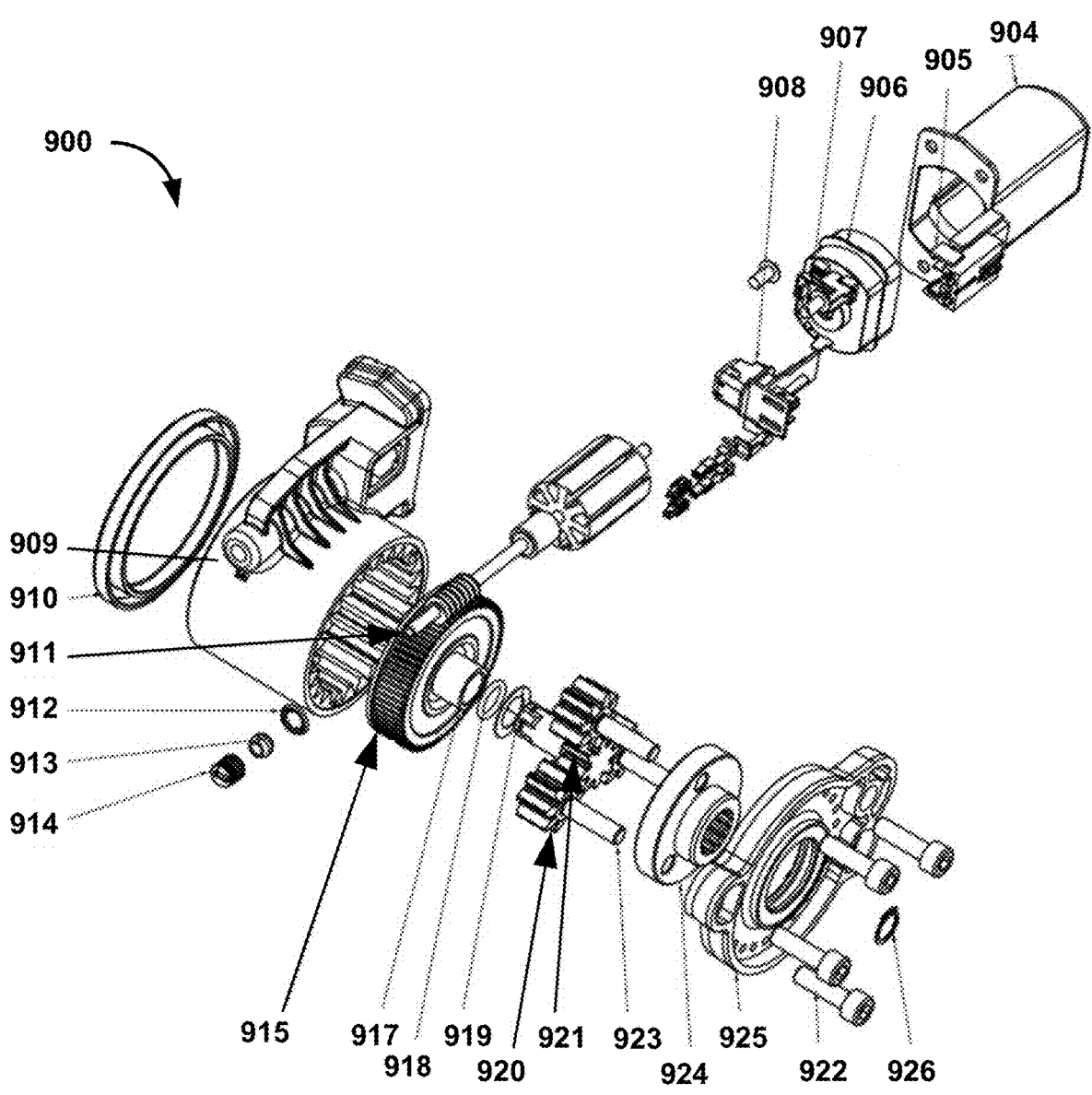
FIG. 11 is an exploded view of a self-locking motor assembly according to an example embodiment of the present technology.

FIGS. 10 and 11 show diagrams depicting an outside perspective view and an exploded view, respectively, of an example embodiment of the self-locking motor assembly 900. The self-locking motor assembly 900 includes a motor 911 and a worm gear 915 (both shown in FIG. 11) that collectively are encased in a motor housing 904 and a worm gear casing 909. In some examples, the motor 911 can include a DC permanent magnet motor, like the permanent magnet direct current motor 30 discussed earlier. The motor 911 includes a stator portion and a rotor portion, which the rotor includes a worm 911A at the end of a rotor shaft 911B (shown in FIG. 12), and which the stator of the motor 911 couples to an armature 906. The worm 911A engages with the teeth of the worm gear 915 so as to cause rotation of the worm gear 915 to in turn cause a planetary wheel drive assembly 920 to rotate, e.g., via interface between a gear box bearing 917 from the worm gear 915 to a planetary shaft 921 of the planetary wheel drive assembly 920. The worm gear 915 is encased within the worm gear casing 909, in which a first opening of the worm gear casing 909 can be partially covered by a cover 910. The planetary wheel drive assembly 920 is encased within the worm gear casing 909 on the other side, in which a second opening of the worm gear casing 909 can be partially covered by a cover 925.

The motor assembly 900 includes the worm gear 915 and the worm reduction mechanism (e.g., worm 911A coupled to the stator of the motor 911 via shaft 911B), which enables the motor assembly to have a reverse self-locking function. In multiple-motorized systems, there is a hidden danger of each motor operating out of synch, which in the case of the two motors in the dual-motor driving mode of vehicle step apparatus 100', could lead to misalignment of the step brackets and result in sagging or drooping of the step. The worm gear 915 and worm reduction mechanism 911A can provide the motor assembly 900 with a means to synchronize two (or more) permanent magnet direct current motors that drive components (e.g., arm assemblies 13a' and 13b') without having to share a common shaft.

For example, a motor having a high rotating speed has an increased load and a decreased rotating speed, whereas a motor having a low rotating speed has a decreased load and an increased rotating speed. Thus, rotating speeds of the two mechanisms reach dynamic balance, thereby realizing the motion synchronization of the two mechanisms.

Referring to FIG. 11, additional components of the example embodiment of the motor assembly 900 are shown, but it is understood that some of these components are not required for providing a self-locking capability. As shown in FIG. 11, the example embodiment of the self-locking motor assembly 900 can include a socket 908 coupled to the armature 906, e.g., which can be attached by hexagon socket head cap screws 907. The socket 908 can be connected to the motor housing 904 and/or worm gear casing 909 by a connector 905. The end of the rotor of motor 911 (with the worm 911A) can be encased in the worm gear casing 909 at worm casing region 909A, in which an opening of the worm casing region 909A can be secured by adjustment screw assembly 914. The end of the rotor can be coupled to a gear box ball bearing 913 and an elastic ring 912. The gear box bearing 917 can interface with the planetary shaft 921 via an O-ring 918 and adjusting washer 919. The planetary wheel drive assembly 920 can include a plurality of planetary gear wheels 920 that interface with the teeth of the planetary output shaft 921, and a plurality of planetary axels 923 and an output planet carrier component 924. The planetary shaft 921 can be secured by a shaft circlip 926.

Figure 12:
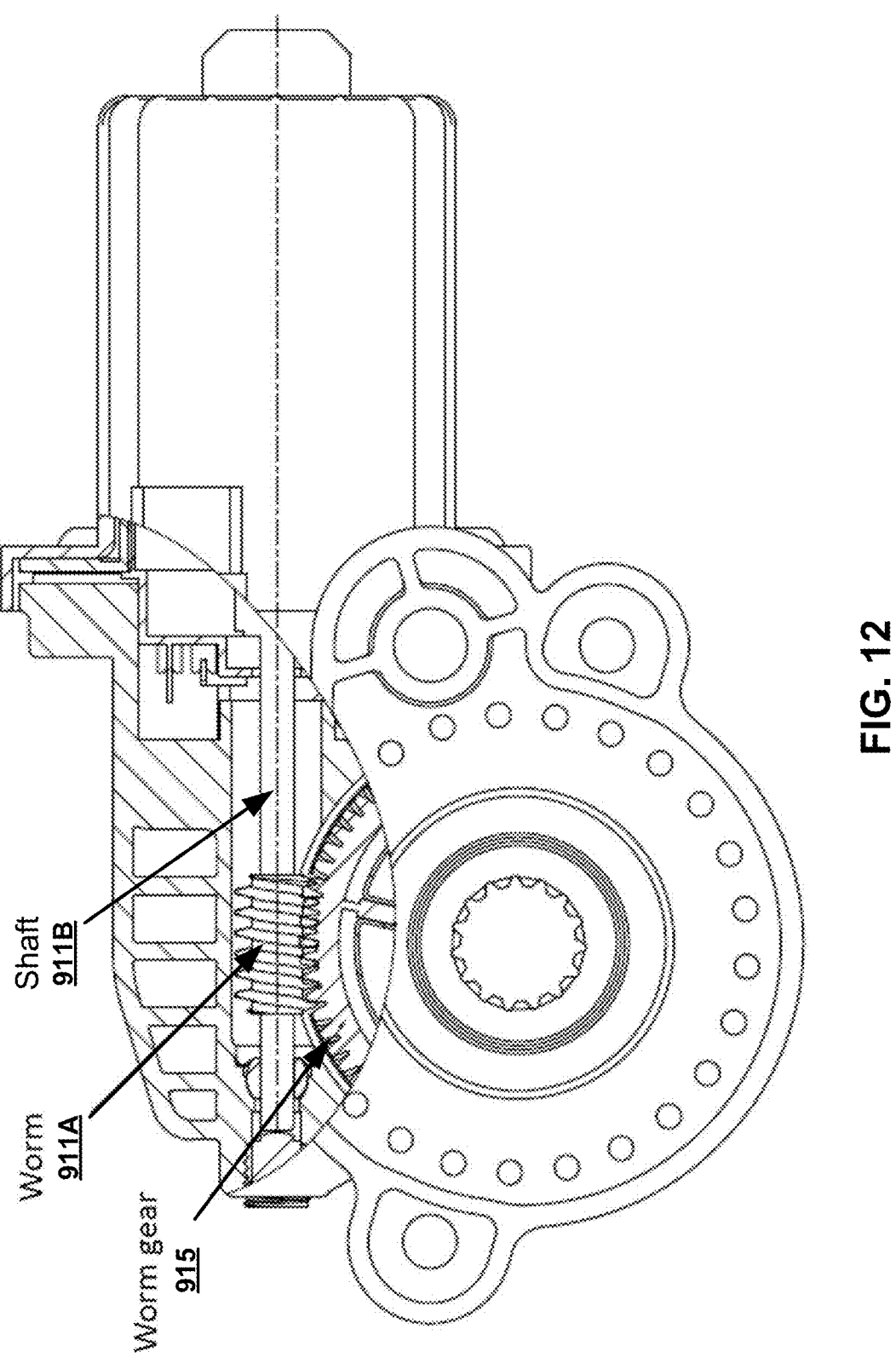
FIG. 12 is a partial sectional view of a self-locking motor assembly according to an example embodiment of the present technology, which shows the interface between a worm reduction mechanism and a worm gear.
Figure 13:
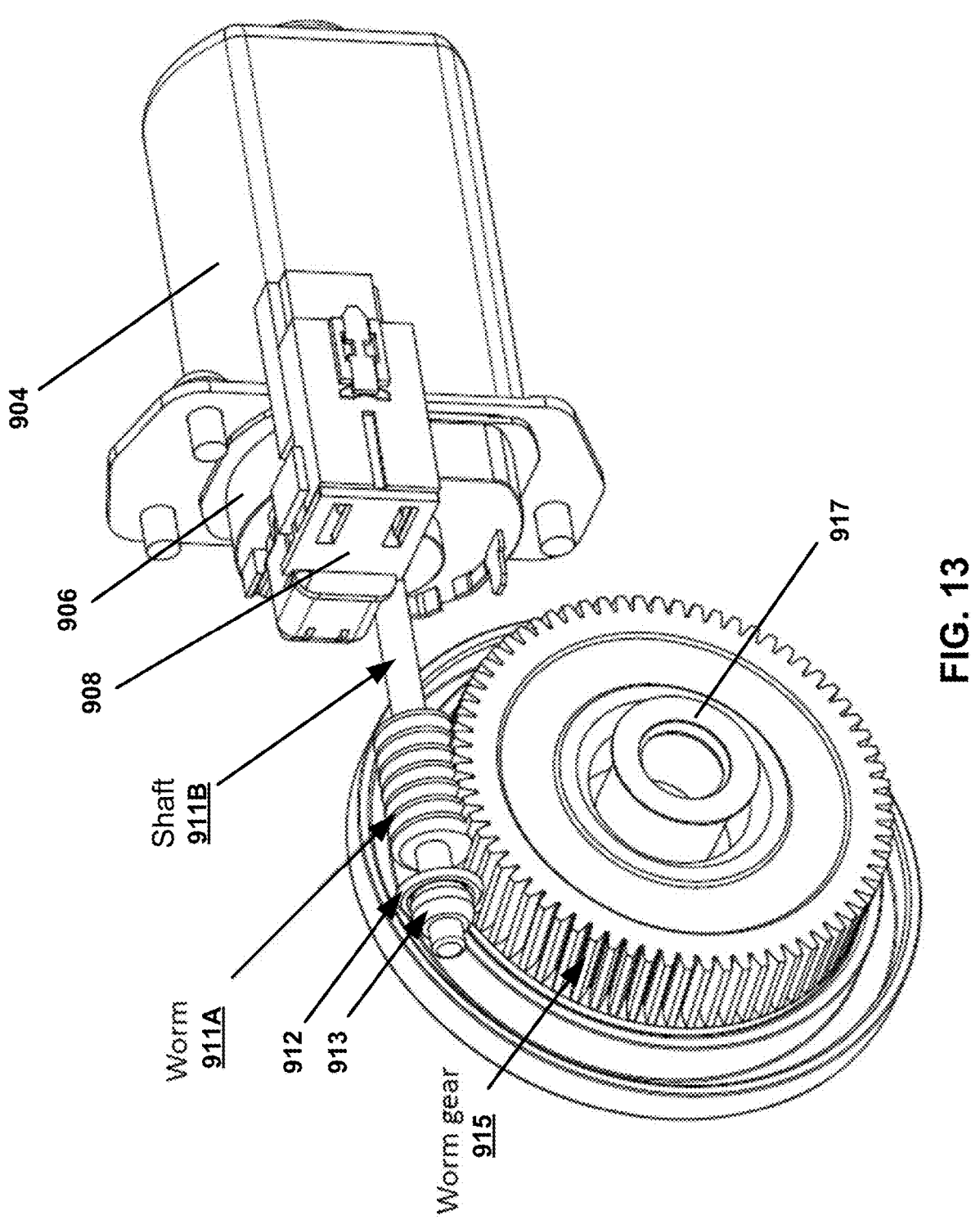
FIG. 13 is another partial sectional view of a self-locking motor assembly according to an example embodiment of the present technology, which shows the interface between a worm reduction mechanism and a worm gear.

FIGS. 12 and 13 show partial sectional views of the self-locking motor assembly 900, which shows the interface between a worm reduction mechanism and a worm gear.

In some embodiments, the vehicle step apparatus 100' can also include the first clastic member 50a and the second elastic member 50b to further augment the drive capability of the first motor assembly 900a and the second motor assembly 900b, respectively. For example, similar to that shown in FIG. 7, the first elastic member 50a can be coupled between the first mounting bracket 11a' and the first motor assembly 900a; and the second elastic member 50b can be coupled between the second mounting bracket 11b' and the second motor assembly 900b. Such embodiments of the vehicle step apparatus 100' can include the example embodiments discussed above for the first elastic member 50a and the second elastic member 50b, e.g., such as the embodiments pertaining to a spring leaf, a disk spring or other elastically deformable component and/or to a cover and/or connection plate.

The disclosed multi-motorized vehicle step device, such as the example vehicle step apparatus 100', provide several advantages over conventional retractable steps, including but not limited to: (1) long service life of the device, e.g., as the multiple (dual) motor driving mode greatly improves the service life of the product and reduces the motor failure rate; (2) the structure is not prone to sag or droop, e.g., as both motors have a self-locking function (e.g., reversible self-locking) to prevent detrimental movements in the extended and retracted positions; (3) reduced costs of the motor system, e.g., as the dual motor driving mode reduces the requirements for motor performance, thereby allowing a motor that is more simple in manufacturing and lower in cost (such that the comprehensive cost of the double motor driving mode and the single motor driving mode is similar if not equivalent); and (4) the dual motor driving mode is more suitable for vehicles with longer and heavier steps.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. The appearances of the phrases throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for operating a motorized vehicle step, comprising:

driving, by a first motor assembly, a first step bracket to move a step, coupled to the first step bracket, between a first extended position and a first retracted position;

driving, by a second motor assembly, a second step bracket to move a step, coupled to the second step bracket, between a second extended position and a second retracted position, wherein the second extended position is aligned with the first extended position, and wherein the second retracted position is aligned with the first retracted position; and retaining, by the first motor assembly and the second motor assembly, the first step bracket and the second step bracket in the first retracted position and the second retracted position, respectively, by a reverse self-locking effect of the first motor assembly and the second motor assembly, respectively, wherein the driving the first step bracket by the first motor assembly and the driving the second step bracket by the second motor assembly, respectively, is performed in unison and with synchronized motion as the step extends and retracts, comprising:

driving the first step bracket, by the first motor assembly, at a first rotational speed that is related to a load applied on the step; and driving the second step bracket, by the second motor assembly, at a second rotational speed that is related to the load applied on the step, wherein the first motor assembly and the second motor assembly decrease the first rotational speed and the second rotational speed, respectively, based on an increasing load applied to the step, and wherein the first motor assembly and the second motor assembly increase the first rotational speed and the second rotational speed, respectively, based on a decreasing load applied to the step, such that the first motor and second motor are able to cause the step to extend and retract between an extended position and a retracted position with the synchronized motion.

2. The method of claim 1, wherein the reverse self-locking effect prevents bi-directional rotation of the first motor assembly and the second motor assembly.

3. The method of claim 1, wherein the step is prevented from vibrating, sagging, or drooping while in a retracted position when the first step bracket and the second step bracket are in the first retracted position and the second retracted position, respectively, due to the reverse self-locking effect.

4. The method of claim 3, wherein the step is prevented from vibrating, sagging, or drooping while in the retracted position due to the reverse self-locking effect after at least two hundred cycles of extension and retraction of the step.

5. The method of claim 1, further comprising:

controlling, by a control mechanism in connection with the first motor assembly and the second motor assembly, actuation of both the first motor assembly and the second motor assembly to cause the driving of the first step bracket and the driving of the second step bracket, respectively, to move the step.

6. The method of claim 1, wherein the retaining includes maintaining the step in a retracted position such that opposing ends of the step are aligned in the retracted position.

7. The method of claim 1, wherein:

the first motor assembly is coupled to a first arm assembly, and the first step bracket is coupled to the first arm assembly, such that the first motor assembly drives the first arm assembly to cause the first step bracket to move the step; and the second motor assembly is coupled to a second arm assembly, and the second step bracket is coupled to the second arm assembly, such that the second motor assembly drives the second arm assembly to cause the second step bracket to move the step.

8. The method of claim 7, wherein:

one or both of the first arm assembly and the second arm assembly include a four-link arm assembly driven by the first motor assembly and/or the second motor assembly, respectively; or one or both of the first arm assembly and the second arm assembly include a five-link arm assembly driven by the first motor assembly and/or the second motor assembly, respectively; or one or both of the first arm assembly and the second arm assembly include a six-link arm assembly driven by the first motor assembly and/or the second motor assembly, respectively.

9. The method of claim 1, wherein each of the first motor assembly and the second motor assembly comprises a motor, a worm shaft having threads and engaged to and driven by the motor to rotate in a rotational direction, a worm gear engaged to the threads of the worm shaft to be driven by the worm shaft, and a gear drive assembly that includes a plurality of different gears engaged to one another and that is engaged between the worm gear and a respective arm assembly comprising the first arm assembly or the second arm assembly, respectively, and wherein the reverse self-locking effect is imparted by at least the worm shaft, the worm gear, and the gear drive.

10. The method of claim 9, wherein the gear drive assembly is operable to, in response to rotation of the worm gear, transmit power and rotation from the worm gear to the respective arm assembly to move a respective step bracket comprising the first step bracket or the second step bracket, respectively, and wherein the worm shaft and the worm gear are structured to create the reverse self-locking effect that prevents bi-directional rotation of the motor in another rotational direction based at least on interaction of the worm shaft and the worm gear.

11. The method of claim 1, further comprising:

storing energy, by an elastic member operable to elastically deform, when the first motor assembly drives the first step bracket to move the step towards the first extended position.

12. The method of claim 11, further comprising:

releasing, by the elastic member, stored energy during the driving of the first step bracket by the first motor assembly to move the step towards the first retracted position.

13. The method of claim 12, wherein the stored energy released by the elastic member assists the first motor assembly to drive the first step bracket.

14. The method of claim 11, further comprising:

storing energy, by a second elastic member operable to elastically deform, when the second motor assembly drives the second step bracket to move the step towards the second extended position.

15. The method of claim 14, further comprising:

releasing, by the second elastic member, stored energy during the driving of the second step bracket by the second motor assembly to move the step towards the second retracted position.

16. The method of claim 15, wherein the stored energy released by the second elastic member assists the second motor assembly to drive the second step bracket.

17. The method of claim 7, wherein the first motor assembly includes a first permanent magnet direct current motor; and wherein the second motor assembly includes a second permanent magnet direct current motor.

18. The method of claim 17, wherein the first rotational speed of the first permanent magnet direct current motor is dynamically balanced with a rotational speed of the second permanent magnet direct current motor so as to realize the synchronized motion of the first arm assembly and the second arm assembly.

* * * * *